United States Patent [19]

Aoki et al.

[11] Patent Number: 4,830,125
[45] Date of Patent: May 16, 1989

[54] PROCESS AND APPARATUS FOR AUTOMATICALLY WEIGHING AND INTRODUCING CHEMICALS

[75] Inventors: Takayoshi Aoki, Toyonaka; Michinobu Kaimori, Nara; Akira Aikawa, Hikone; Akira Urakami, Miyakojima; Gen Nishimura, Hikone; Tohru Koide, Yao; Osamu Ishimaru, Matsubara; Masao Takigawa, Toyonaka; Fumio Shirai, Nishinomiya, all of Japan

[73] Assignees: Kanebo Ltd., Tokyo; Hisaka Works, Ltd., Osaka, both of Japan

[21] Appl. No.: 218,147

[22] Filed: Jul. 13, 1988

[30] Foreign Application Priority Data

| | | |
|---|---|---|
| Jul. 16, 1987 [JP] | Japan | 62-179637 |
| Feb. 18, 1988 [JP] | Japan | 63-037151 |
| Feb. 18, 1988 [JP] | Japan | 63-037152 |
| Mar. 28, 1988 [JP] | Japan | 63-077639 |
| Mar. 28, 1988 [JP] | Japan | 63-077640 |
| Mar. 28, 1988 [JP] | Japan | 63-042309 |

[51] Int. Cl.⁴ ............ G01G 19/22; B01F 15/04
[52] U.S. Cl. ............................. 177/1; 177/70; 366/141
[58] Field of Search ................ 177/1, 70; 366/141

[56] References Cited

U.S. PATENT DOCUMENTS

| | | | |
|---|---|---|---|
| 3,878,907 | 4/1975 | Morick | 177/70 |
| 4,310,060 | 1/1982 | Phillips, Jr. et al. | 177/70 |
| 4,544,279 | 10/1985 | Rudolph | 177/70 X |
| 4,660,990 | 4/1987 | Svensson | 366/141 X |

FOREIGN PATENT DOCUMENTS 1403624 8/1975 United Kingdom ................ 177/70

Primary Examiner—George H. Miller, Jr.
Attorney, Agent, or Firm—Stevens, Davis, Miller & Mosher

[57] ABSTRACT

A process and apparatus for automatically weighing and introducing chemicals are intended to automatically weigh the chemicals and introduce the chemicals into a treatment tank; the chemicals are injected into a chemical container and weighted, and then transported to a dissolving tank adjunct to the treatment tank, and then introduced into the dissolving tank. A control means is provided to put under its control the operations of injecting into a chemical container a desired amount of desired chemicals selected from among plural sorts of chemicals and driving a transportments and an introducing means automatically in association with this injecting operation.

14 Claims, 25 Drawing Sheets

PROCESS AND APPARATUS FOR AUTOMATICALLY WEIGHING AND INTRODUCING CHEMICALS

BACKGROUND OF THE INVENTION

The present invention relates to a process and apparatus for automatically weighing and introducing chemicals such as dyestuff (dye) or auxiliaries (dyeing aid), and particularly to a process and apparatus for automatically weighing and introducing chemicals, wherein the procedure steps of from the weight measurement of chemicals to the introduction of same can be automatized or unmanned.

As shown in FIG. 38, a conventional dyeing operation comprised procedure steps of supplying water through a pipe 142 into a dissolving tank 141 adjust to a tank 140 containing dye, beating the supplied water by supplying steam from a steam supply pipe 143, as needed, introducing chemicals such as dyestuffs or auxiliaries prepared by operators into the hot water, agitating the chemicals by means of a stirrer 144 for dissolution purpose, and injecting the resultant liquid chemicals into the suction side of a pump 146 through an opened valve 145.

Such a method, however, required a manual weight measurement of chemicals, which led to a variation in measured values, errors in measurement, etc., making is difficult to increase the degree of accuracy of dyeing. Additionally in such a manning operation, operators attending to the weight measurement had to handle the machines for a long period of time, and to keep their eyes on the progress of operations in each of treatment tasks.

Japanese Utility Model unexamined publication No. 61-103493 disclosed a process for automatizing the supply of chemicals to dye treatment tanks, wherein as shown by FIG. 39, a determined amount of each of chemicals is passed through valves 162 in opening and closing action, which are provided on pipes 155-161 disposed between different kinds of tanks 147-153 containing the chemicals and dissolving tanks 155 of treatment tanks 154 until the chemicals are introduced via the dissolving tank 155 and an injection pump 163 into the treatment tanks 154. The treatment tank is provided with a circulation pump 164.

With such a chemicals supply system as illustrated by FIG. 39, as indicated by a long and short dash line and a two-dot chain line, if the number of the treatment tanks is increased, the chemicals will have to be fed to the dissolving tanks belonging to the respective treatment tanks, so that the each pipes 156-161 will necessarily be branched to connect with the corresponding dissolving tanks 155.

This, therefore, makes the piping very complicated, causing installation cost expensive. In particular, in case a large number of the treatment tanks 154, namely 8-10 units, are installed, it was hard to handle a supply of chemicals made through the abovementioned particular piping. And if the supply amount of chemicals is small, there will be created a problem that the accuracy may drop due to residual chemicals deposited on the inner side of the pipes. On the other hand, in the event that a cleaning takes place for the purpose of increase in accuracy, a problem has arisen that the amount of the liquid used had totalled up to an excessive one.

Japanese Patent unexamined publication No. 61-41364 disclosed a system in which a container holding a stock solution such as liquid dye and placed on a rotary table is lifted by a lower weighing device being elevated, up to a position where the weight of the container is measured.

In accordance with this system, such a described inconvenience is avoided because a precise measurement can be performed for the amount of the chemicals to be delivered to the treatment tan. However, even though the amount of the chemicals to be supplied can be measured accurately by such a proposed system, after measuring operation, the container must be removed from the rotary table to be transported to the dissolving tank of the treatment tank, and therefore, in view of all the steps of from the measurement of chemicals to the supply of same to the dissolving tank, the efficiency of operation is very poor, and a full automatization of the whole steps is no longer possible.

Another system for supplying and measuring the amount of chemicals in a precise manner has been disclosed by Japanese Patent unexamined publication No. 60-241923, wherein as chemicals are forced into a chemical container by blowing a compressed air to said container, a determined amount of the chemicals may be measured by use of an electronic balance.

Furthermore, Japanese Patent unexamined publication Nos. 61-289169, and 62-101663, 62-109800 proposed systems enabling a precise measurement by steps of introducing most of chemicals into a chemical container through an opened electromagnetic valve for a large supply and then adding a trace of the chemicals through an electromagnetic valve for small supply in an open position. But, none of said publications disclosed any concrete means for achieving an automatization of the steps from the measurement to the supply to the dissolving tank

SUMMARY OF THE INVENTION

The principal object of the present invention is to provide a process and an apparatus for automatically weighing and introducing chemicals, wherein the operations may be carried out automatically throughout the whole procedure steps of measuring, transporting, and introducing chemicals into the treatment tank dependment on an operative progress made in the treatment tank in order to increase the accuracy of treatment and the efficiency of the operation.

Another object of the present invention is to provide a process and an apparatus for automatically weighing and introducing chemicals, wherein the accurate measurement of the amount of chemicals can be achieved and a chemical weighing means in provided for making automatically operable the procedure steps from the weight measurement of chemicals to the supply of same.

Further object of the present invention is to provide a process and an apparatus for automatically weighing and introducing chemicals, wherein a chemical container transport means is provided which would need no complicated pipings for any structure involving a large number of treatment tanks, thus the construction cost being inexpensive.

Further object of the present invention is to provide a process and an apparatus for automatically weighing and introducing chemicals, wherein the efficient transportation of the chemical containers may be performed dependent on the description and amount of chemicals used.

Further object of the present invention is to provide a process and an apparatus for automatically weighing and introducing chemicals, wherein the use of the transport means requiring no complicated piping even in case of a large number of the treatment tanks installed ensures that the introduction of chemicals into the dissolving tank is made automatically operative.

Furthermore, another object of the present invention is provide a process and an apparatus for automatically weighing and introducing chemicals, wherein a small amount of the chemicals remaining inside the chemical container after the introduction can be cleaned with a dilute solution, thereby enabling the concentration of a treatment liquid to be maintained constant in a precise manner.

In accordance with the one aspect of the present invention, there is provided a process for automatically weighing and introducing chemicals, involving steps of injecting into chemical containers only a desired amount of desired chemicals selected from among plural sorts of chemicals, transporting said chemical containers to the dissolving tanks adjust to the treatment tanks, and introducing the chemicals from the chemical containers arrived at the dissolving tank into the latter.

Furthermore, in accordance with another aspect of the present invention, there is provided an apparatus for automatically weighing and introducing chemicals, comprising a means for injecting a determined amount of chemicals from a plurality of tanks each containing the chemicals into the chemical containers and weighing the chemicals, a transport means for transporting said chemical containers to the dissolving tank adjust to the treatment tank, an introduction means for introducing the chemicals from the chemical container just arrived at said dissolving tank into the latter, an injection control means for injecting into said container for chemical preparation only a desired amount of desired chemicals in response to a signal giving an order for introduction of chemicals into said treatment tank, and a transport/introduction control means for transporting said chemical container to said dissolving tank with said transport means actuated by a signal indicating the completion of the injection of the chemicals into said chemical container and then introducing the chemicals into the dissolving tank.

DETAILED DESCRIPTION OF THE INVENTION

General System

Figure 1:
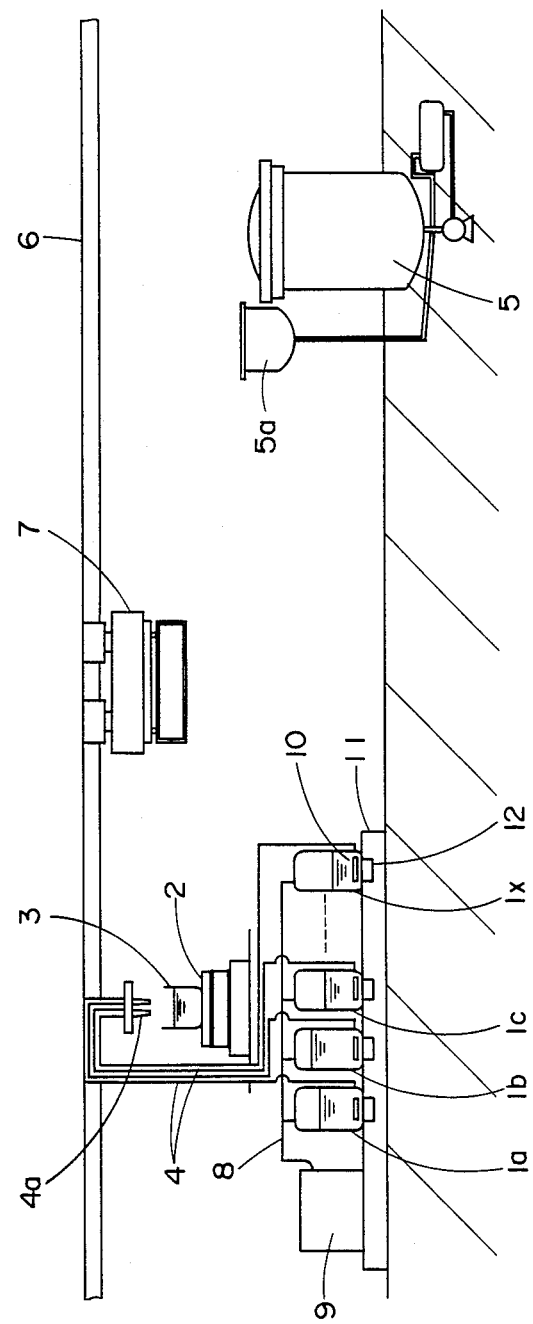
FIG. 1 is a view of one embodiment of the present invention.

The whole system for automatically weighing and introducing chemicals will be described with reference to FIGS. 1–13. These figures of drawings and the description give a specific picture of the principle of the present invention in order to help understand the present invention, with the description of the preferred embodiments of the invention to follow.

As shown in FIGS. 1–10, the weighing and introduction system is intended to automatically conduct operations throughout the steps including the final step of the introduction of chemicals into a dissolving tank 5a adjust to a treatment tank 5 as a dyeing machine, and which system comprises an injection means for injecting a determined amount of chemicals in response to a signal, from the treatment tank 5, giving an order for the introduction of chemicals from chemical storage tanks 1a, 1b ... 1x containing the chemicals such dye, dyeing aid, etc., via an injection tube 4 into chemical containers 3, a weight measurement means for measuring sequentially on a weighing device 2 such as an electronic balance the weight of the chemicals of plural kinds to be injected into the chemical containers, a transport means for transporting along rails 6 disposed extending from the weighing device 2 to the dissolving tank 5a the chemicals containers 3 in response to a signal for an order for the injection of chemicals into chemical containers 3 and the termination of weight measurement operation, an introduction means for introducing the chemicals into the dissolving tank 5a by inverting or inclining the chemical container 3 transferred to a position just above the dissolving tank 5a, and a cleaning means for cleaning the inside of said chemical containers 3 after the introduction of chemicals.

Referring to FIG. 1, the numeral 10 designates magnet stirrers for agitating the chemicals in the tanks 1a ... 1x. The magnet stirrers 10 are driven by magnet stirror drives 12 incorporated in a base structure 11.

Figure 2:
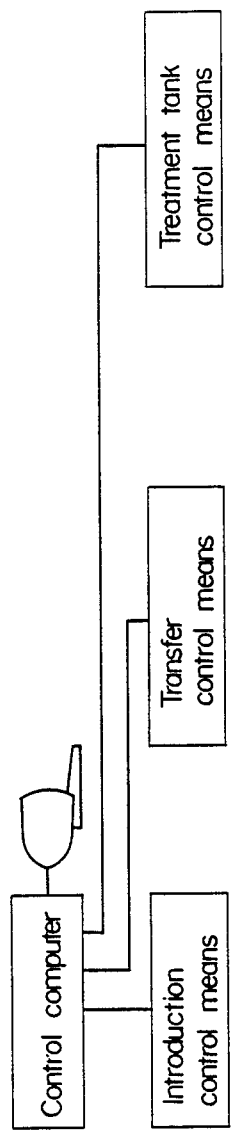
FIG. 2 is a block diagram drawing the respective control means in this embodiment.
Figure 3:
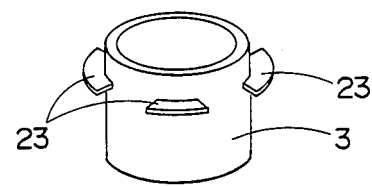
FIG. 3 is a perspective view of a chemical container of this embodiment.
Figure 4:
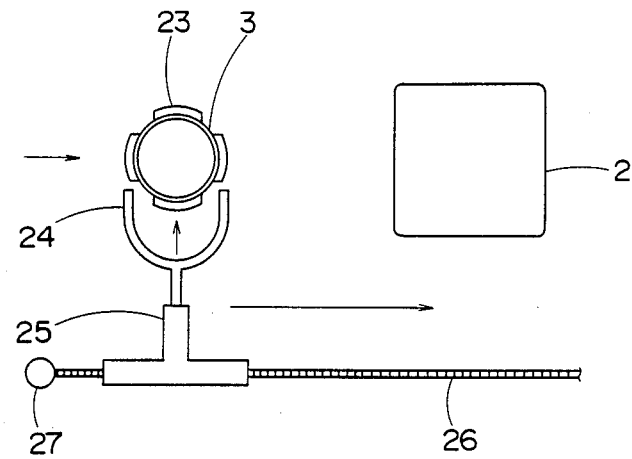
FIG. 4 is a view showing the way of transporting the chemical container to an electronic balance.

FIG. 2 illustrates a control system in the instant embodiment, wherein an feed control means 3 for actuating said air supply unit 9 to introduce a desired amount of desired chemicals into the chemical container 3, a transport control means 14 for operating said carriage 7 to transport, said chemical containers 3 and also to introduce its contained chemicals into the treating tank 5, and a treating tank control means 15 for controlling the treating tank 5 are connected to a general control computer 16 respectively so as to receive control instructions from the computer 16 to each of the control means 13, 14, 15. The number of the treating tank control means 15 must be corresponding to the number of the treatment tank 5 installed. The general control computer 16 has a terminal 17 connected thereto for outputting necessary informations.

Figure 5:
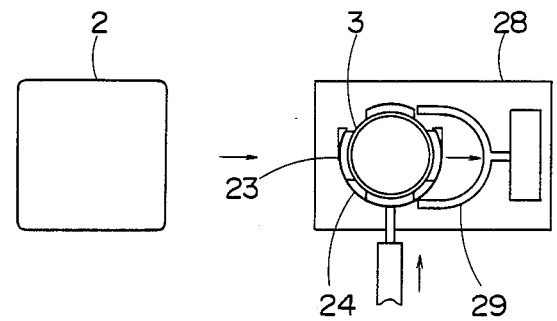
FIG. 5 is a view showing the way of transporting the chemical container from the electronic balance to a tray.
Figure 6:
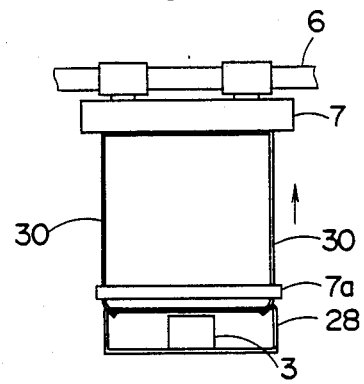
FIG. 6 is a front view showing the state of such a transportation.
Figure 8:
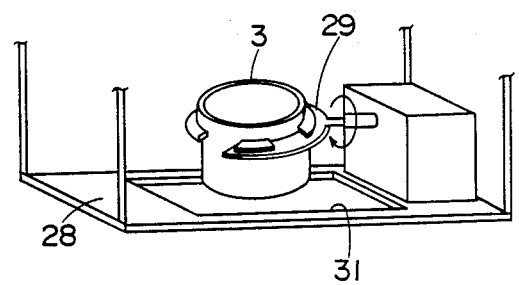
FIGS. 8 and 9 are views showing the introduction of chemicals.
Figure 7:
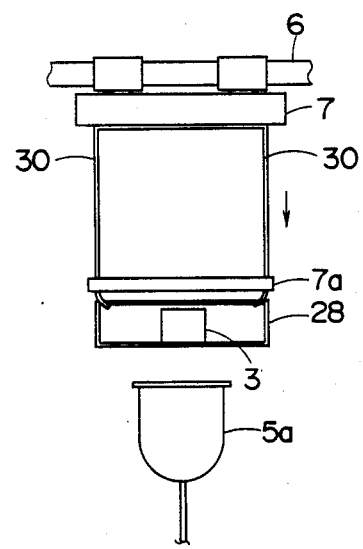
FIG. 7 is a front view showing a stop mode above a dissolving tank.

The chemical container 3 may be made of stainless steel, having an open top portion and flange pieces 23 attached to the upper part of the outer peripheral surface thereof, as shown in FIG. 5. The positioning of the chemical container 3 on the electronic balance 2 is achieved, as shown in FIG. 6, by steps of raising the container 3 after taken out of a container stock with an arm 24 extending from a cylinder 25 and supporting the flange pieces 23 of the container 3, moving the cylinder 25 over to the electronic balance 2 by means of a threaded rod 26 which is rotated by a motor 27, and lowering the container 3 down to the electronic balance 2. After the weight measuring operation is over, the container 3 is displaced to a carrying tray 28 as the former is being held by the arm 4, as shown in FIG. 7. The container 3 is placed on the tray 28. The tray 28 is provided with an arm 29, which will hold the container 3.

Figure 9:
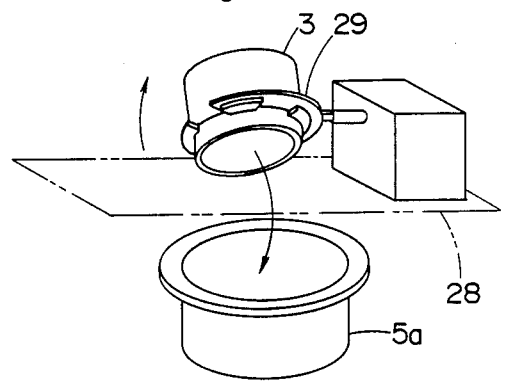
Figure 10:
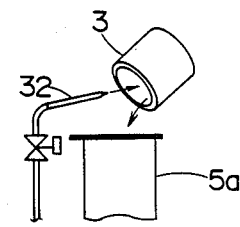
FIG. 10 is a view showing the container being cleaned after the introduction.
Figure 11:
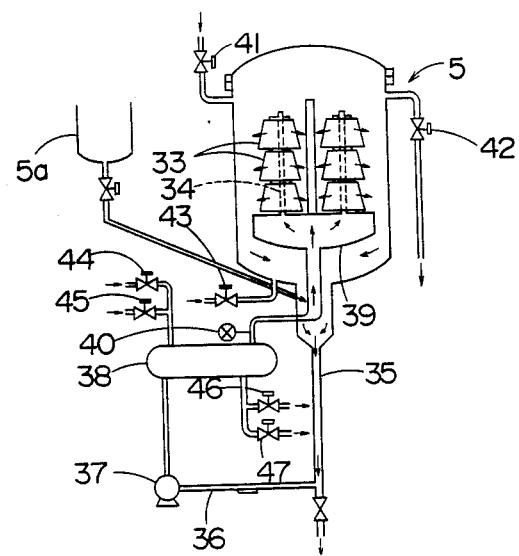
FIG. 11 is a view of a dyeing machine being a treatment tank.
Figure 12:
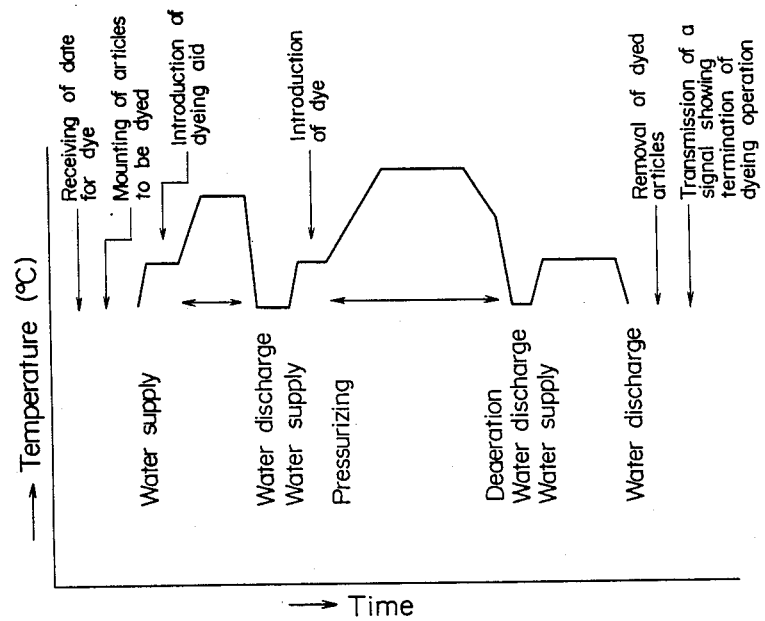
FIG. 12 is a graph showing the relation between the time and the temperature during the dyeing operation.
Figure 13:
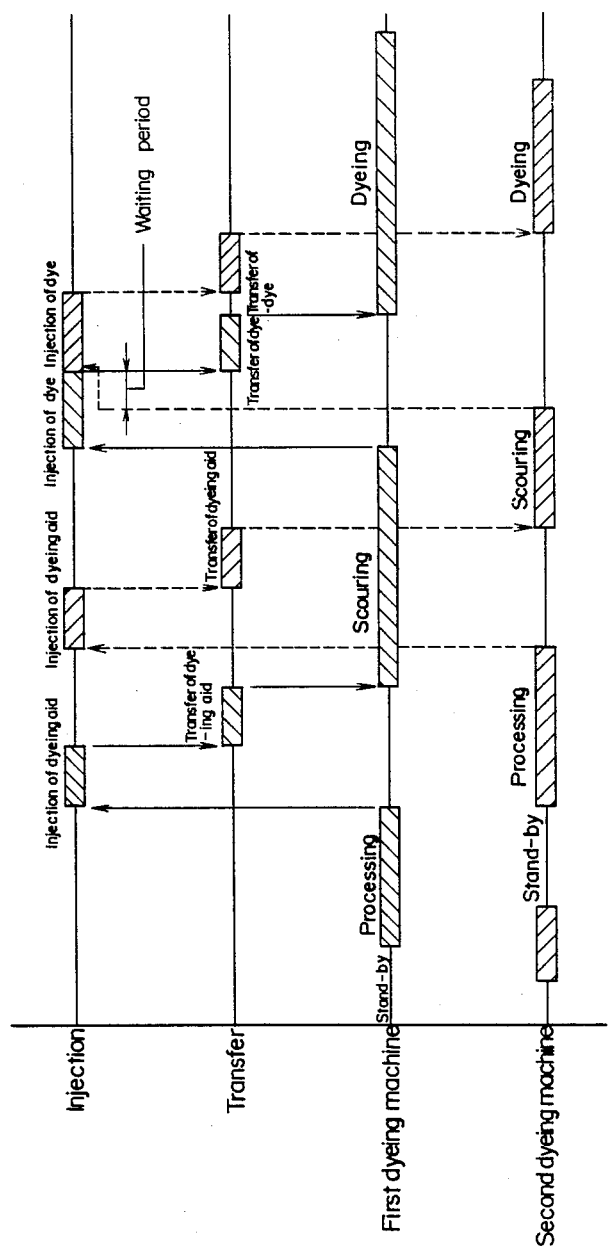
FIG. 13 is a flow time chart of from the introduction to the dyeing operation.

FIG. 6 illustrates the state of the chemical container being transported by the carriage 7. The carriage 7 is suspended movably by the rail 6 and has take-up wires (or belts) 30 connected to its lower portion and adapted to hang a holding plate 7a elevatably by the use of hooks provided on the holding plate 7a. The tray 28 travels along the rail 6 toward the treatment tank 5 as it remains held by the holding plate 7a in an elevated position. And as shown by FIG. 9, the carriage 7 is stopped above the dissolving tank a attached to the treatment tank 5, and then the tray 28 is lowered close to the tank 5a. Subsequently, as shown in FIGS. 10 and 11, the rotation of the arm 29 forces the chemical container 3 into a inverse position so that the chemicals will be introduced into the dissolving tank 5a. The tray 28 has a bottom plate provided with an opening 31 through which chemicals may be dischanged.

In order to wash out the chemicals remaining within the container 3 after the discharge, as shown by FIG. 10, the inside of the container is cleaned by injecting water from an injection nozzle 32 provided near the dissolving tank 5a, and then the washed liquid chemicals are to be fallen into the dissolving tank 5a. As for a cleaning agent, it i preferable to use a dilute solution produced by diluting the introduced chemicals with, i.e. a solvent such as water by reason of the prevention of variation of the treatment liquid in concentration. Then, the container 3 is transferred to the container stock, wherein the former will be cleaned by means of a separate cleaning unit.

FIG. 11 shows a dyeing machine which is used as treatment tank 5 in this embodiment, wherein articles 33 to be dyed which are in the form of yarn wound around bobbings into a cone-shape will be fit onto spindles 34 which are held in a upright position within the treatment tank 5. The spindles 34 are of hollow structure and provided on its outer periphery with a large number of perforations, through which liquid dye will be injected inside the treatment tank 5. To the bottom of the treatment tank 5 is connected an outlet pipe 35, from which a circular pipe 36 is branched to be coupled with a circular pump 37 and a heat exchanger 38, so that a liquid may be returned to a base 39 of said spindles 34. A temperature sensor 40 is connected to the outlet side of the heat exchanger 38. The treatment tank 5 is connected to a combination of a pressure valve 41, a deaeration valve 42, and a water supply valve 43, and the heat exchanger 38 has connections with a cooling water feed valve 44, a steam feed valve 45, a steam drain valve 46, and a cooling water discharge valve 47.

In the dyeing operation, there are procedure steps of supplying water into the treatment tank 5, injecting chemicals such as liquid dyes from the dissolving tank 5a, sucking a liquid from a treatment tank 5b with the circular pump 37 in action to the heat exchanger 38 where the liquid will be heated, and ejecting the heated liquid through the perforations pieced on the periphery of the spindles 34 into the treatment tank 5b. In this instance, the articles 33 to be dyed wound up in the shape of cone are fit onto the spindles 34, and the liquid is destined to be ejected from the inner sides of the cone-shaped articles 33 toward their outer sides, whereby the articles 33 can take a uniform dye.

Figure 14:
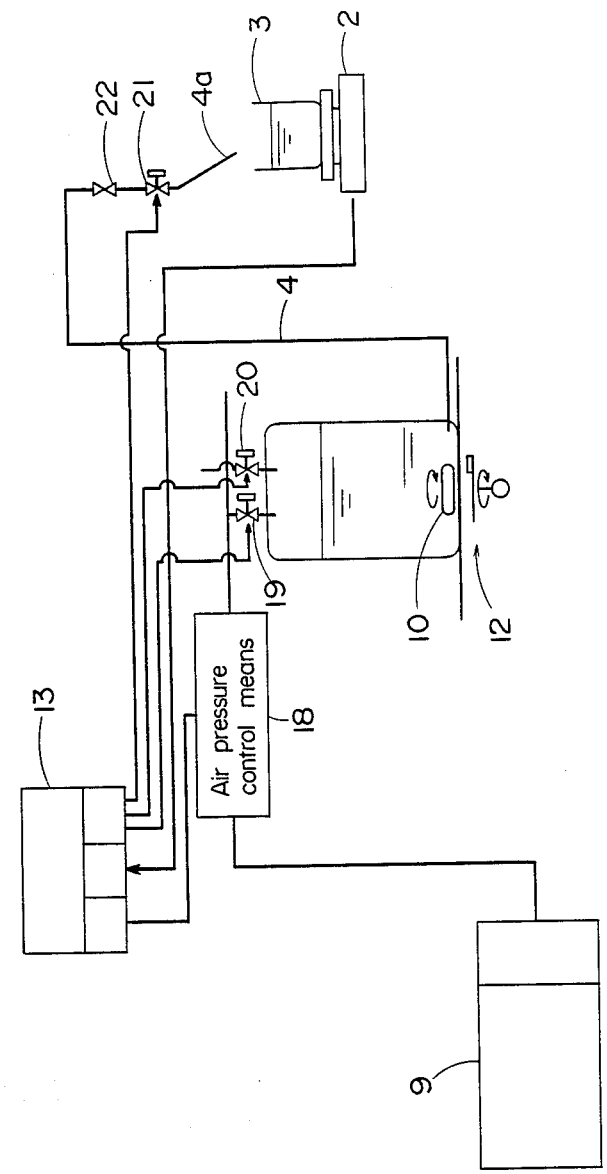
FIG. 14 is a view showing a control means for the introduction of chemicals.

The control of the treatment tank 5 is performed by the treatment tank control means 15 (FIG. 2); an opening and closing signal is delivered to the respective valves 41 ... 47 in response to a procedure program for treatment operation (dyeing data) received in advance from he control computer 16 as well as a temperature signal produced by the temperature sensor 40. FIG. 14 illustrates the relation of time and temperature, the time between the reception by the treatment tank control means 15 of dyeing data, data for the weight of articles 33, etc. and the transmission of a signal informing the end of a dyeing operation. In this drawing, arrows A show that the temperature control is carried out in the regions thereof.

As shown by FIG. 14, two separate feed operations take place for a single dyeing treatment (e.f. feedings of a dye aid and a dye), and as the case may be, more than four separate feed operations are required (e.g. in the dyeing operation for wool-polyester blended yarn, there are needed feedings of a dye aid, a dye for wool yarn, and a dye for polyester yarn, as well as a soaping operation).

Figure 15:
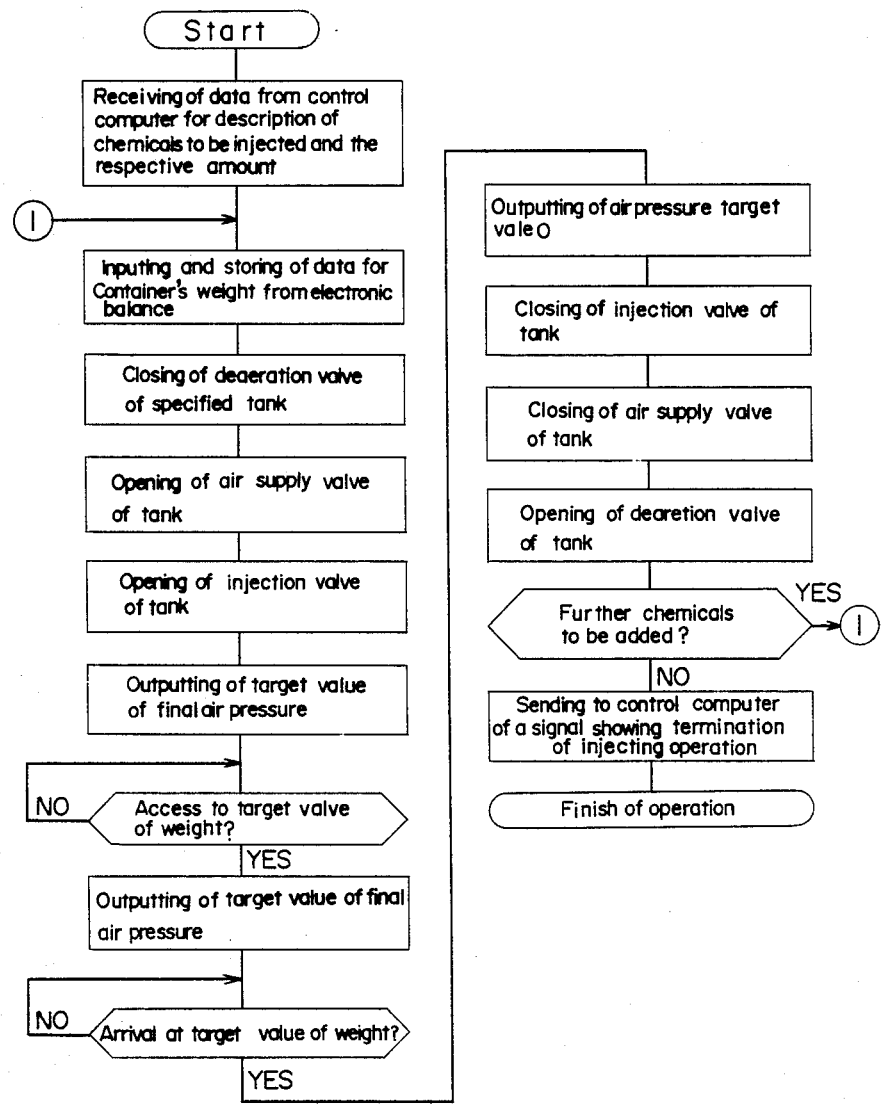
FIG. 15 is a flow chart showing the operation of the control means for the introduction of chemicals.

Usually, a plurality of the treatment tank 5, for example, ten or more, are installed rather them a single one, and a corresponding number of the control means 15 are provided with respect to the number of the treatment tanks used, so that the timing for feeding materials into each of the treatment tanks 5 must be considered in weight measurement and transport operations. FIG. 15 is a time chart showing one example of the timing of the weight measurement and transport operations in case that the dyeing operation is carried out by the use of two treatment tanks 5 into which dye aids and dyes are supplied. Various sorts of treatments are achieved in such an efficient manner that after the weighing/transporting operations take place for the first treatment tank, the same operations are carried out for the second treatment tank.

Injection of Chemicals I

As illustrated by FIG. 1, the chemical storage tanks $1a$, $1b$ ... $1x$ are connected at the top portions thereof with an air supply tube 8 respectively so that in the event of introduction of chemicals, an air supply unit 9 (air compressor) is actuated to supply air to these tanks in order to increase the inner pressure of the tanks to a sufficient degree to force the chemicals into each of the chemical containers via an injection tube 4. The chemical containers are here positioned above the tanks $1a$, $1b$ ... $1x$. Such an arrangement that the introduction of chemicals into the chemical containers may be achieved by supplying air to the respective tanks $1a$, $1b$ ... $1x$ advantageously makes it possible to adjust the flow rate of liquid by the change of air pressure.

The detailed control mechanism in accordance with an injection control means 13 as shown in FIG. 2 is represented in FIG. 14. The injection control means 13, which is constituted by a micro computer, serves to control air pressure established by an air pressure control means 18 and the opening and closing of an air supply valve 19, a deaeration valve 20 and an injection valve 21 in accordance with signals transmitted from the general control computer 16, and indicating the description of chemicals and injection amount. On the other hand, the weight measurement unit 2 on which the chemical container 3 is placed transmits a weight signal to the injection control means 13. Said chemical containers 3 are automatically taken out of a container stock (not shown) and then placed on the weight measurement unit 2. The injection valve 21 has a needle valve 22 mounted on the top thereof for adjusting the flow rate of injected chemicals.

FIG. 15 shows a operation procedure taken by the injection control means 13 as shown in FIG. 14. At the outset, the injection control mean 13 receives from the control computer 16 a datum of the description and the amount of chemicals to be injected and from the weight measurement unit 2 a datum of the weight of each of the chemical containers, these data being memorized by the control means 13. Then, the deaeration valve 20 of a tank containing specified chemicals is closed, and the air supply valve 19 as well as the injection valve 21 are opened, so that air is supplied by the air pressure supply means 18 to the chemical storage tank to increase the inner pressure, whereby the target valve of an initial air pressure will be outputted for the increase of injection flow rate. This permits air to be delivered from the air supply unit 9 to a determined chemical tank to start the injection of chemicals. And when the amount of the chemicals being injected (the valve indicated by the measurement unit 2—the valve of weight of the container) has been found to come close to the target valve, the target valve of a final staged air pressure will be outputted to restrict the injection flow rate. And when the target valve for the injection is reached (this target valve used here shall be a valve preclusive of the amount a drop of the liquid immediately after the injection valve 21 has been closed), there is produced a signal representing that the air pressure target valve is equal to zero so as to let the injection valve 21 and the air supply valve 19 be closed, while the deaeration valve 20 is opened. If further chemicals need to be injected, the above-described operation will be repeated (this is shown by 1 in FIG. 4). On the contrary, if there are no more chemicals to be injected (it is a general practice to inject plural kinds of chemicals together), a signal showing the termination of injection is transmitted to the control computer 16, thereby to finish the operation.

In order to prevent dropping onto the measurement unit 2 of a liquid remaining in a nozzle $4a$ after the removal of chemical container 3 from the unit 2, a shutter (not shown) may be provided for the prevention of a dropping.

Introduction of Chemicals II

Figure 16:
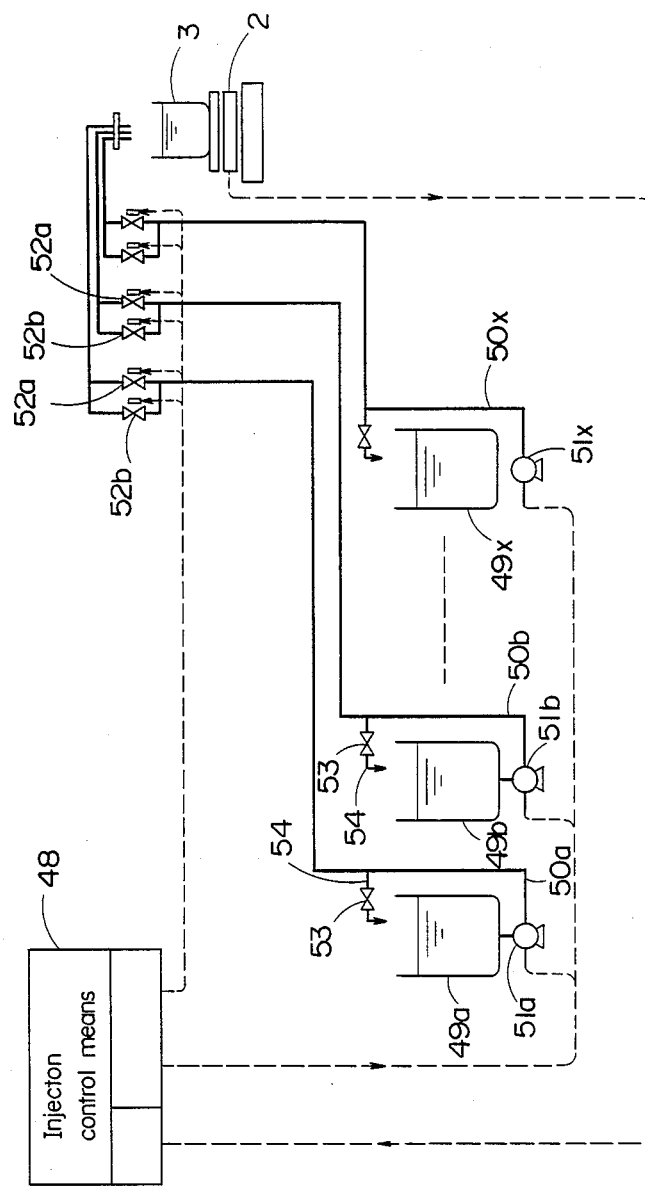
FIG. 16 is a view showing another chemicals introduction means using a measuring valve and its control means.

FIG. 16 shows a control mechanism according to another injection control means 48. This control mechanism has an arrangement such that pipes $50a$, $50b$ ... $50x$ each are connected to the respective chemical tanks $49a$, $49b$ ... $49x$ on the bottoms of thereof, each of the pipes having a pump $51a$, $51b$ ... $51x$ placed thereon, in order that chemicals may be supplied to chemical containers 3. Each pipe have measuring valve $52a$ allowing the passage of a large flow rate and a measuring valve $526$ allowing the passage of a small flow rate connected in parallel with each other. Each pipe also has a circulation pipe 54 with a circulation valve 53 branched therefrom, to ensure that the chemicals will be moved around with retained uniformity of liquid.

Figure 17:
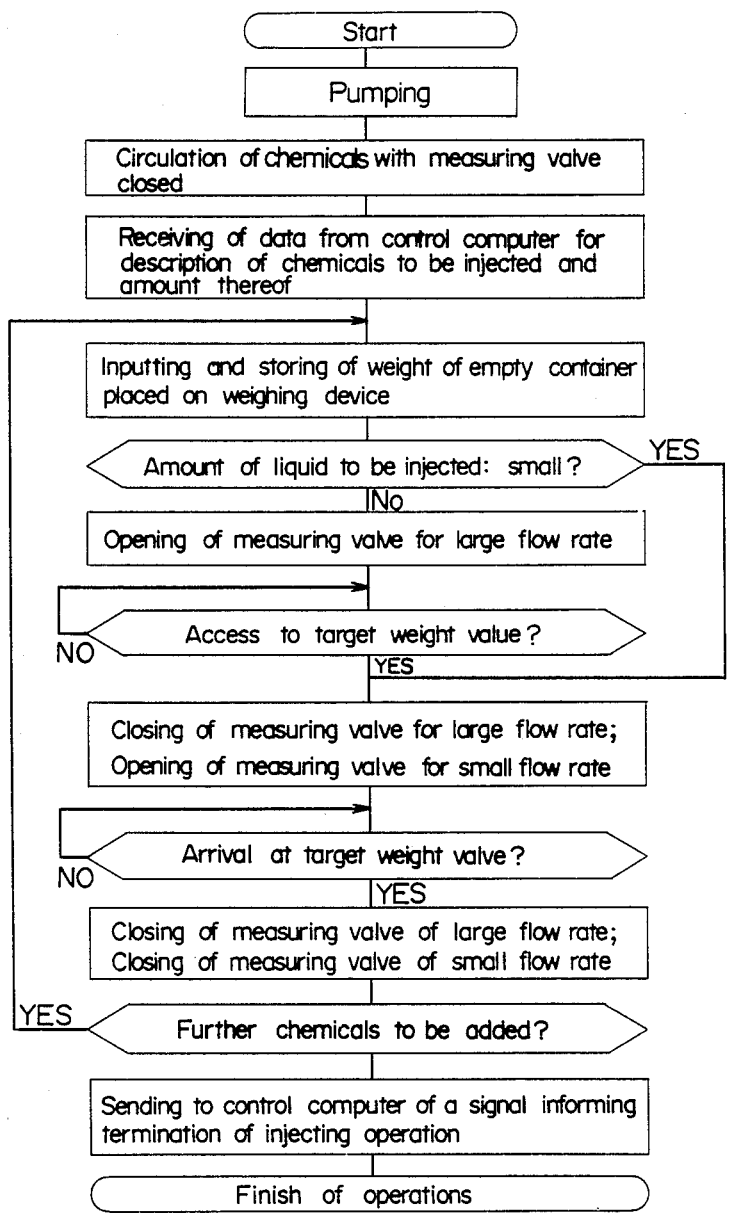
FIG. 17 is a flow chart showing the operation of the chemicals introduction control means using a measuring valve.

For the introduction, an operation takes place as seen in FIG. 17. In this mode of operation are used the two measuring valves $52a$, $52b$ having different capacities with respect to the flow rate of passing chemicals, wherein by the time when the weight target value is approached, the measuring valve $52a$ with large capacity is kept opened to allow a quick injection of the chemicals into the container 3, and when the target valve is approached, the measuring valve $52a$ is automatically replaced by the measuring valve with small capacity so as to lower down the injection with the result that a saving in time for and the accuracy of the weight measurement will be increased. Provision of the measuring valves $52a$, $52b$ which can be replaced from one to another for the control of the injection speed may cheaper the cost of construction of the equipment.

Weight Measurement of Chemicals

Figure 18:
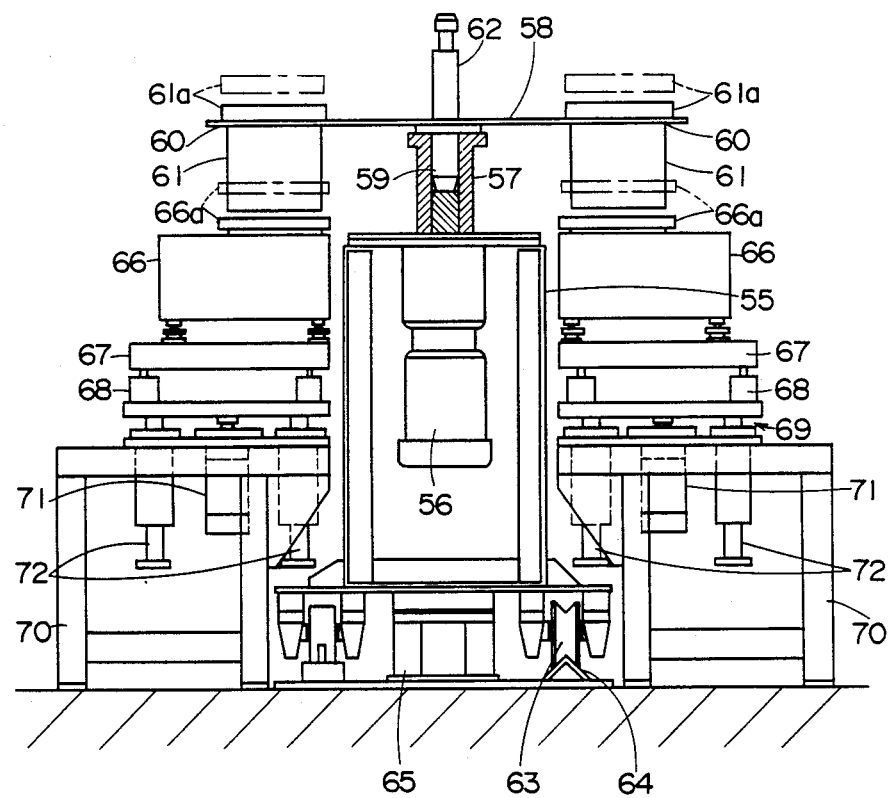
FIG. 18 is a partially cut-away view showing a preferred embodiment of the chemicals weighing unit in accordance with the present invention.
Figure 19:
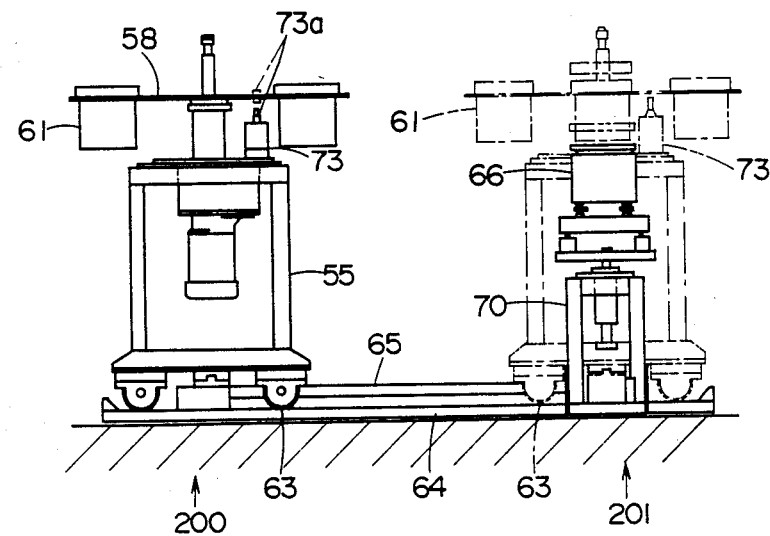
FIG. 19 is a side view of FIG. 18.
Figure 20:
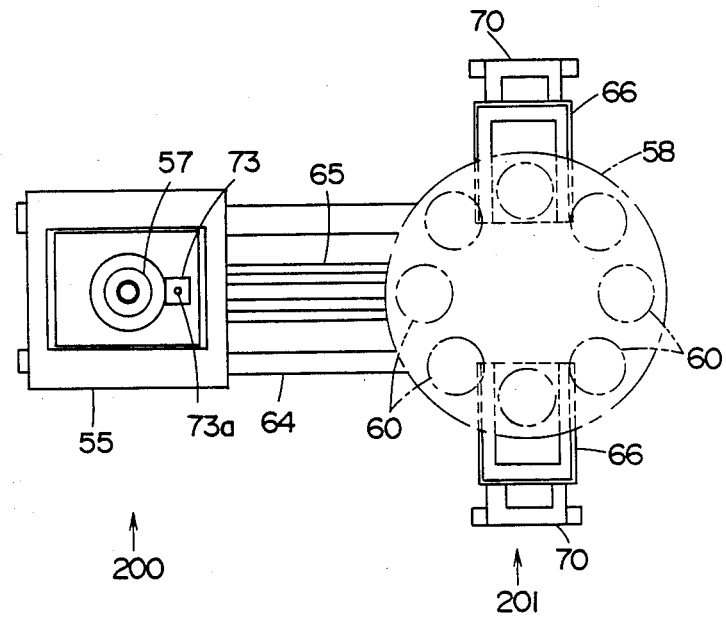
FIG. 20 is a plan view.

As illustrated by FIGS. 18–20, the carriage 55 includes an intermittent-rotational means 56 (e.g. a geared motor with a brake) within its chassis and a tubular receiver 57 projecting from its upper portion. A center shaft 59 sticks out downwardly from a holder 58 to fit into the receiver 57, and thereby to support the holder 58 in a horizontal position above the carriage 55. A further center shaft 62 projects upwardly in opposition to the downward center shaft 59, the center shaft 62 being intended to grasp the holder 58 to raise it. This facilitates transportation of the holder 58.

The carriage 55 has wheels 63 mounted on the lower portion thereof, and as shown in FIG. 19, a travelling means 65 (e.g. rodless cylinder) with its one end secured to the bottom of the carriage 55 so as to allow the latter to move on rails 64, which are disposed between the position 200 in which the holder is mounted and demounted and the position where weight measurement is effected.

As shown in FIG. 20, the holder 58 takes the form of a disk having a plurality of holes 60 arranged at regular intervals circumferentially thereof. The holder 58 can hold chemical containers 61 which are received by these holes 60 with the flange pieces 61a of the containers 61 bearing against the circumferential edges of the holes 60.

In the position 201, as shown by FIGS. 18 and 20, measuring means 66, 66 are provided on both side of the carriage 55. The measuring means 66 may be constituted by an electronic balance. Each of the measuring means 66 is mounted on the upper portion of an elevating means 69 with a vibration-proof member 67 and a shock absorbing material 68. Said shock absorbing material 68 acts as a cushion when the measuring unit 66 is fully loaded on its weight platform 66a. Said elevating means 69 consists of a trestle 70 and a cylinder 71 (air cylinder or hydraulic cylinder) mounted on the trestle 70, and the cylinder in interposed between a pair of guide axes 72 for guiding the measuring means 66 upon its vertical movement.

FIGS. 19 and 20 illustrate a stopper 73 which is disposed side by side with the receiver 57 on the top portion of the carriage 55 for positioning purpose. This stopper 73 is intended to positively stop at a determined position the holder 58 rotated intermittently for displacement by the rotation means 56 in order to effect weight measurement operation. The positioning of the holder 58 may be achieved by collapsibly extending an axis 73a on the upper and through small holes (not shown) opened in the holder 58.

Now the weight measurement operation using the present weight measurement system to weigh chemicals will be described sequentially.

Mounting of the holder

In the holder mounting position 200 the holder 58, which is holding empty chemical containers 61, is mounted with its center shaft 59 engaged into the receiver 57 on the upper portion of the rotation means 56.

(b) Movement of the carriage

After mounting the holder 58, the carriage 55 is moved as far as the measurement position 201.

(c) Intermittent rotational movement

In the measurement position 201, the holder 58 is driven by the rotation means 56 into intermittent rotation until a determined chemical container 61 is stopped above the measuring means 66, and then the positioning stopper 73 is actuated to position the holder 58. In this event, there are a pair of opposite chemical containers 61, 61 positioned above the measuring means 66, 66 on both sides with the center draft 59 interrupted therebetween.

(d) Lifting of the chemical containers

After the positioning of the holder 58, the cylinder 71 of the elevating means 69 urges the both measuring means 66, 66 to go upward, thereby placing chemical containers 61 on the respective weight platforms 66a, wherein the chemical containers are partially raised beyond the holder 58 (the raised part is shown in a long and short dash line). This results in the full loads of the chemical containers 61 being applied to the weight platforms 66a.

(e) Weight measurement

The chemical container, after filled with chemicals, is weighed on the weight platform 66a. At this time, the feed amount of the chemicals is automatically controlled in response to a signal from the measuring means 66, so that a desired amount of chemicals may be introduced accurately.

(f) Return

After the operation, the cylinder 71 is actuated to let the measuring means 66 go down until the chemical container 61 just subjected to weight measurement is engaged into the holes 60 of the holder 58 again.

With the above-described operation are finished the feeding of chemicals into and weighing of same in the two opposite chemical containers 61, 61. Then, the axis 73a of the positioning stopper 73 is released from the holder 58, which will be driven by the rotation means 56 to rotate by a hole 60 and then another new chemical containers 61, 61 are positioned above the measuring means 66 for the next weight measurement operation, and thereafter the foregoing procedure steps (c)–(f) will be repeated for further weighing of chemicals.

At the time when the operation for weighing all the chemical containers 61 has been completed, the carriage 55 is displaced to bring the holder 58 to the original position 200 where to mount and demount the holder. Then, the holder 58 is lifted by a gripper means of a transport unit, which will be described later, with the center shaft 62 in the grip of the gripper means, so as to remove the holder 58 from the receiver 57 of the rotation means 56.

Although the arrangement of this embodiment is such that the rotation means 56, since it is secured to the carriage 55, is movable on the rails 64 between the position 200 where to mount and demount the holder and the position 201 where to effect weight measurement, without the use of such a carriage 55, the rotation means 56 may be secured to the position 201, in which the mounting and demounting of the holder 58 is carried out.

In this embodiment, a pair of the chemical containers 61, 61 which are opposed to such other with the center shaft 59 located therebetween can be subjected to weight measurement at the same time, but the measuring means 66, 66 may be so arranged, for example, that the two chemical containers positioned at an angle of about 90 degrees with each other around the center shaft 59 can undergo the weight measurement simultaneously, or more than three weighing means of same type are disposed around the rotation means 56 so as to enable the weight measurement of more than three chemical containers. Alternatively, only a single unit of the measuring means 66 may be provided as that the chemical containers 61 can be checked one by one, accordingly.

This specific weighing system is capable of weighing chemicals accurately to ensure that the accuracy of treatment of chemicals will not only be increased but also the holder 58 is used to efficiently achieve the operation steps wherein the holder 58 supporting a plurality of chemical containers 61 is mounted on and demounted from the rotation means 56 so that said chemical containers can be transported to and discharged from the weighing system. This, therefore, may contribute greatly to a full automation of all the steps from the weight measurement to the treatment in the treatment tank for the chemicals.

Even when the downward center shaft 59 of the holder 58 is engaged into and removed from the receiver 57 on the upper portion of the rotation means 56, the chemical containers 61 can be maintained in a stable manner, which may avoid any inversion of the chemical containers or any spilling of chemicals from the chemical containers.

Furthermore, the measuring means 66, 66 arranged by the both sides of the rotation means 56 respectively makes it possible to simultaneously weigh a pair of chemical containers 61, 61 which are opposed to each other with the center shaft 59 interposed therebetween, thus securing an increase of efficiency. The holder 58 is always kept well balanced because the introduction and weight measurement operation takes place on the two chemical containers opposed to each other with the center shaft 59 positioned therebetween.

Transport of Chemical Containers

Figure 21:
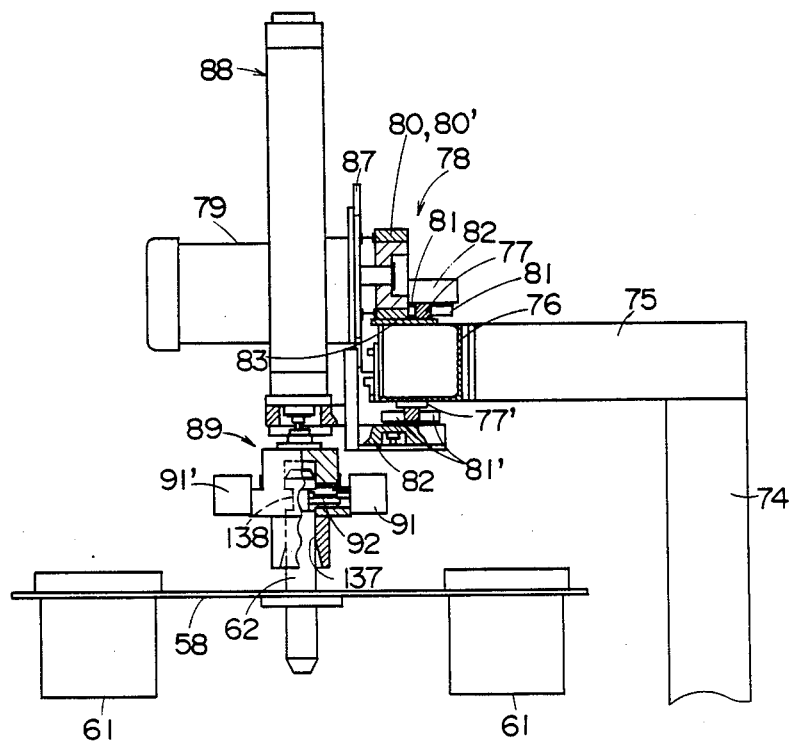
FIG. 21 is a partially cut-away view showing a preferred embodiment of the transport unit in accordance with the present invention.

FIG. 21 shows the cross section of a fixed frame 6 which is supported in a horizontal position by a column 74 and an arm 75 connected to the upper and of the column 74. On the upper and lower faces of the fixed frame 76 are there located rails 77, 77'.

Figure 22:
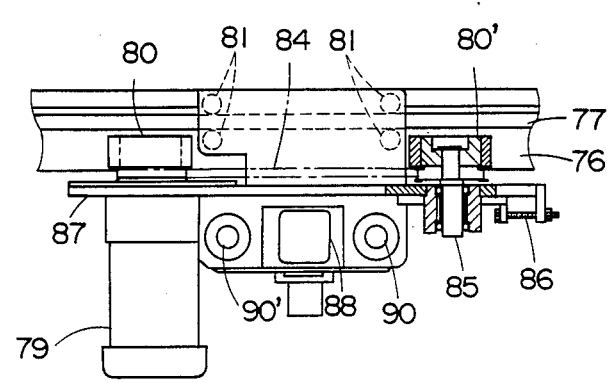
FIG. 22 is a plan view of FIG. 21.

A travelling means 78 is composed of a pair of wheels 80, 80' driven for rotation by a motor 79 (FIG. 22), rolling-proofed rotors 81, 81, 81', 81' engaged with said rails 77, 77' at the both sides of the latter, and holders 82, 82' for holding these rotors. Said wheels 80, 80' are movable on a flat plate 83 on the surface of the fixed frame 76. As shown by FIG. 22, a belt 84 is bridged between the wheels 80, 80' so as to enable them to rotate together. In FIG. 22, the numeral 85 designates a bearing for the wheel 80' and 86 a position adjustment screw for the wheel 80'.

Figure 23:
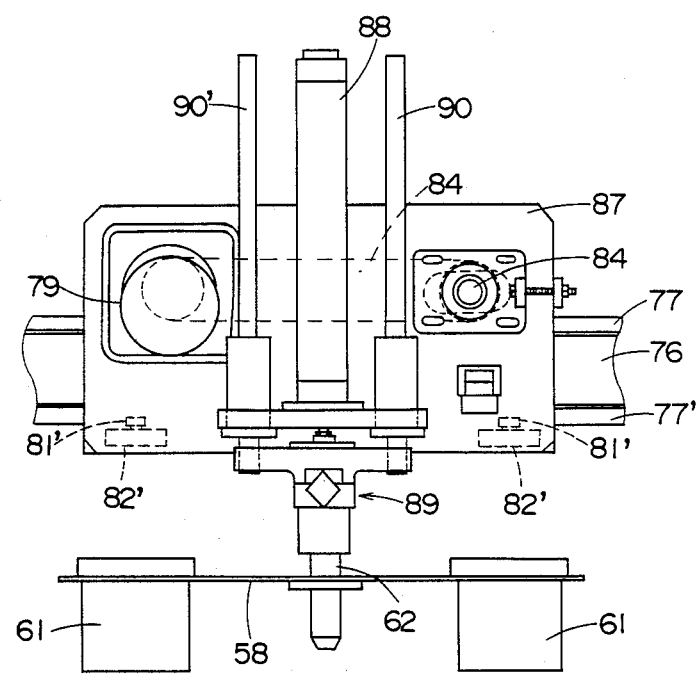
FIG. 23 is a side view.

To a transport means 87 provided with the travelling means 78 is mounted an lifting means 88 constituted by an air cylinder or hydraulic cylinder and attached in a upright position. The cylinder includes a rod at its lower and a gripping member 89 mounted on the lower and of the rod. FIG. 23 shows that the lifting means 88 is located between guide bars 90, 90'.

As illustrated by FIG. 21, the gripping member 89 is constituted by a tubular bottom-closed body having a hole 137 with a downward opening, and cylinders 91, 91' are placed by the opposite sides of the member 89. Stoppers 92 are extended telescopically from the cylinders 91, 91' to the inside of the hole 137.

The holder 58, which is held fast by the gripping member 89, being the same one in which chemicals supplied were weighed during the operation of weight measurement, as described before, serves to hold a plurality of chemical containers 61 arranged circumferentially of the holder. A recess 138 is formed near the leading end of the upward center shaft 62 provided in the holder 58. A stopper 92 sticks out to engage the recess 138 in order to prevent the center shaft 62 from slipping off.

The operation for transporting the chemical containers 61 will be described in a sequential order.

(1) Chucking of holder 58

As aforementioned, after a plurality of the chemical containers 61 fit in the holes 60 formed on the holder 58 have been filled with a predetermined amount of chemicals, the gripping member 89 in moved down by the lifting means 88 from the upper transport unit, then the center shaft 62 of the holder 58 is inserted into the hole formed on the lower end face of the member 89, then as soon as the leading end of the center shaft 62 reaches the depth of the holder 90, the stoppers 92, are urged to protrude to engage into the recess 138 thereby seizing the holder 58 firmly.

(2) Lifting

Upon holding the holder 58, the gripping member 89 is lifted by the lifting means 88.

(3) Transport

The holder 58 is moved along the rails 77, 77' by the wheels 88, 80' which are driven by the motor 79 up to the level above a support (described later) existing close to the chemical feeder.

(4) Downward

After arriving over the support, the holder 58 is moved downwardly by the lifting means 88, and placed on the support.

(5) Releasing

The retreating of the stopper 92 of the gripping member 89 releases the center shaft 62 from its fixed state. And then, the gripping member 89 is raised by the lifting means 88 to leave the holder 58, and thereafter, the chemical introduction unit is actuated, as will be described later, to start introducing chemicals into the dissolving task of the treatment tank.

(6) Return

After released, the holder 58 is returned to the position of (1) in order to restart the next transport operation.

Due to the fact that the gripped holder 58 holding the chemical containers 61 is advanced as far as the chemical introduction unit, the construction of enabling the passage of the chemical containers over the chemical introduction unit installed on the respective treatment tanks allows the chemical containers 61 to be readily supplied to the each chemical introduction units, even if there are set up a large number of said treatment tanks.

Consequently, there is no complicated piping required as in the case of feeding various sorts of chemicals through the pipe lines, and also no problem will arise that there remain some of the chemicals within the pipes, which may lead to the increase of accuracy of chemical feeding.

Additionally, the transport of the holder 58 by the traveling means 78 to the dissolving tank of the treatment tank renders maintenance easy and construction cost inexpensive, thereby enabling automatization of the transportation step.

The use of the holder 58 ensures that a plurality of chemical containers are kept well balanced and that the transport operation is executed in a stable manner.

And besides, since the holder 58 is transported with the center shaft 62 jutting out of the holder and held fast by the gripping member 89, the gripping structure of the holder can be simplified, and safe transport of the holder 58 may be secured by the use of the stopper 92 for preventing slippage.

Feed of Chemicals

Figure 24:
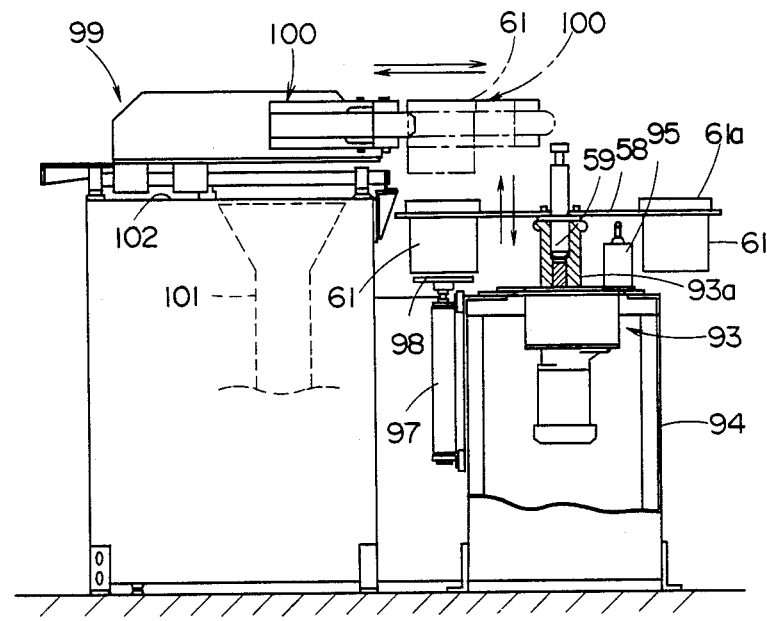
FIG. 24 is a partially cut-away view showing a preferred embodiment of the chemicals introduction unit in accordance with the present invention.
Figure 27:
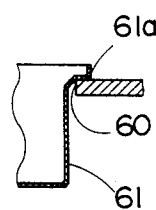
FIG. 27 is a cross sectional view showing a holder supporting the chemical container.

As shown in FIG. 24, the holder 58 carrying a plurality of chemical containers 61 is moved by the transport means until the center shaft 59 is removably engaged into the tubular receiver 93a provided on the upper surface of the intermittent rotation means 93. The chemical containers 61 are supported with the flange pieces 61a on the upper edges thereof engaged on the circumferential edges of the holes 60 of the holder 58 (see FIG. 27).

Figure 25:
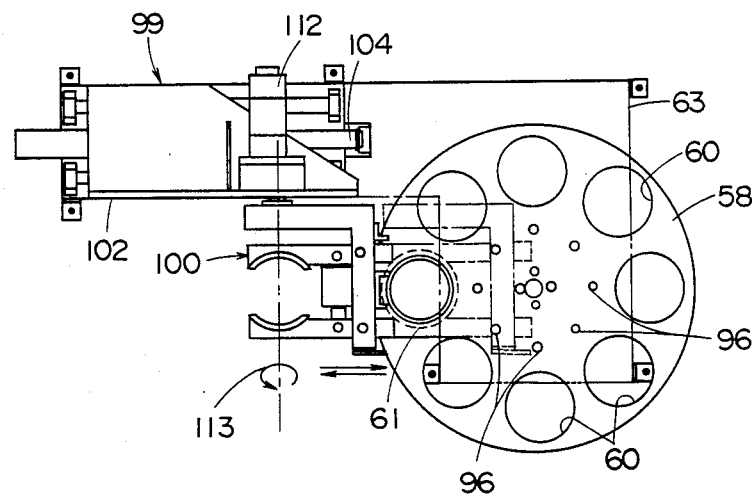
FIG. 25 is a plan view of FIG. 24.

The intermittent rotation means 93 may use a gear motor with a brake, for example. This particular means is mounted on the reverse side of the top plate of a trestle 94 with said receiver 93a stuck out of the top plate. In addition to the receiver 93a the positioning stopper 95 for the holder 58 is also mounted on the top plate. This positioning stopper 95 has an axis starting from its upper face to extend upward in such a manner that the axis will be received by the small holes 96 formed in the holder 58 as shown in FIG. 25 to put the holder in position-assuerdly.

A take-out means 97 in the form of a cylinder for taking out the chemical containers 61 from the holder 58 is coupled to one side of the trestle 94. The take-out means 97 is provided with a plate 98 on the top end of a upper rod thereof for pushing up the chemical containers positioned above the plate.

Figure 26:
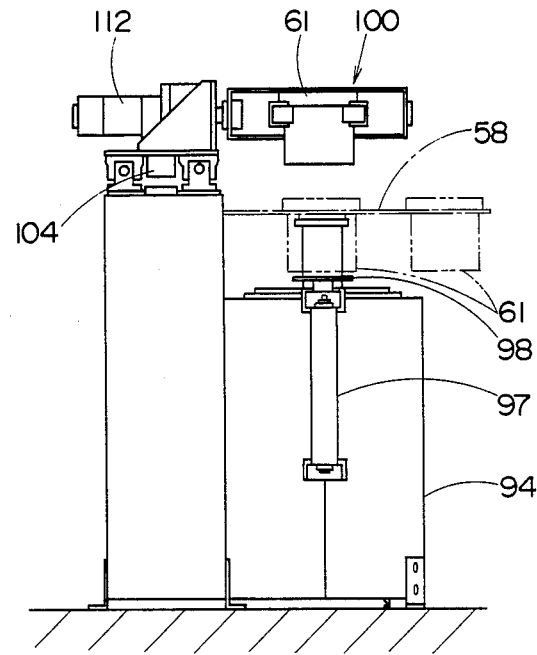
FIG. 26 is a side view.
Figure 28:
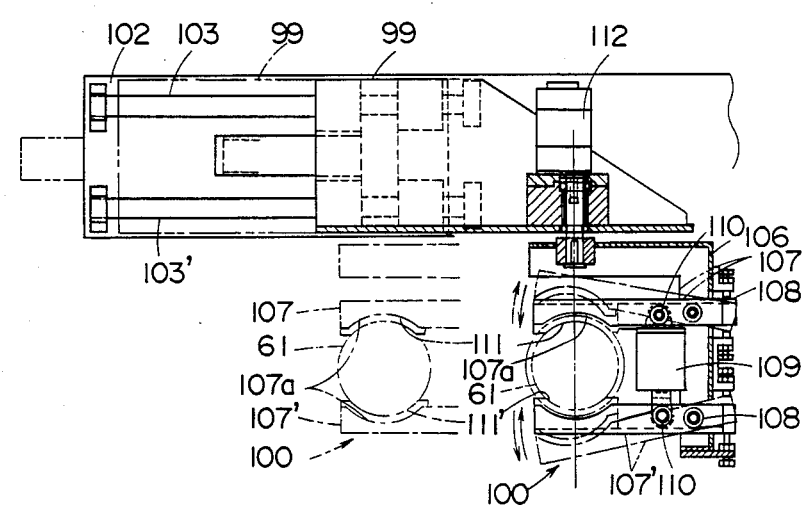
FIG. 28 is a plan view of a travelling means.
Figure 29:
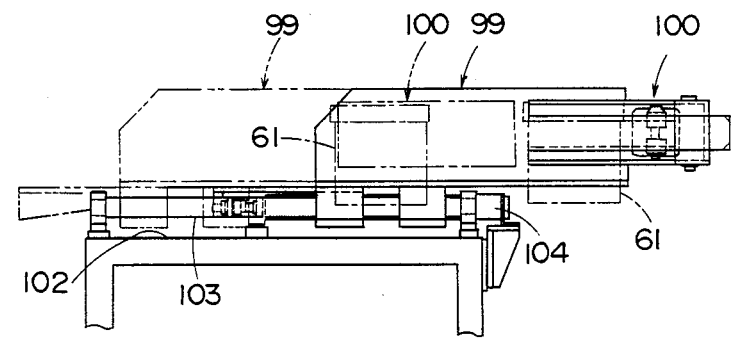
FIG. 29 is a front of same.

The chemical container 61 which has been moved upward by such a take-out means 97 is seized firmly by a gripping member 100 provided on a travelling means 99, as shown in FIG. 26, which will slide the chemical container 61 upward to the point just above and near a dissolving tank 101. FIG. 28 and 29 show details of the travelling means 99. FIG. 28 is a plan view of the travelling means 99 and FIG. 29 is a front view of same. The travelling means 99 is mounted slidably on guide bars 103, 103' secured to a mounting structure 102 so as to be slidable along the guide bars 103, 103' by the aid of a cylinder 104 beneath the travelling means 99, as shown in FIG. 29.

Figure 30:
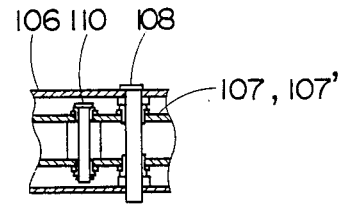
FIG. 30 is a cross sectional view taken along the line X—X of FIG. 28.

As shown by FIG. 28, in the gripping member 100, a pair of arms 107, 107 are retained by one piece of a L-shaped frame 106 so as to be pivotable around a pivot 108 and to be movable toward and away from the both ends of a cylinder 109 by means of a shaft 110, and have concave sections 107a formed on the opposite top ends thereof for gripping chemical container 61 and having a cushioning material 111 such as rubber attached to the inner side of the concave section 107a. FIG. 30 is a cross sectional view taken along line X—X of FIG. 28, showing the structure that arms 107 are mounted on L-shaped frames 106.

The gripping member 100 is connected by its one piece to a rotation means 112 such as a motor fitted to the travelling means 99. At this time, the pair of arms 107, 107' may be extended in the same direction of the other piece of the L-shaped frame 106. This can make the system compact.

(1) Mounting of holder 58

The holder 58, which has been moved by the transport means, is mounted to the receiver 93a of the intermittent rotation means 93 at the center shaft 59.

(2) Intermittent rotation of holder 58

The holder 58 is rotated intermittently by the intermittent rotation means 93 to move above the take-out means 97 for taking out chemical containers in sequence, and then stopped by the positioning stopper 95 in a determined position.

(3) Taking out chemical containers

Upon the stop of intermittent rotation, a push-up plate 98 on the top end of the take-out means 97 ascends to lift the chemical containers 61. At this moment, the travelling means 99 is located in the position shown in a long and short dash line in FIG. 24, and the arms 107, 107' are kept opened in the gripping member 100. The chemical container 61 is pushed upward between the arms 107, 107'

(4) Gripping of chemical containers

The both arms 107, 107' are closed or pivoted to move toward each other by means of the cylinder 109, thereby to grip the chemical container 61.

(5) Movement of chemical container 61

After, held fast by the gripping member 100, the chemical container 61 is moved by an actuated sliding cylinder 104 until the former arrives just above and near the dissolving tank 101.

(6) Introduction chemicals

When the chemical container 61 arrives just above and near the dissolving tank 101, the rotation means 112 rotates (shown by arrow 113 in FIG. 25) to introduce the chemicals in the chemical container 61 into the dissolving tank 101.

(7) Return of chemical container 61

After the introduction of the chemicals, the chemical container 61 resumes its initial upright position, then is returned to the original take-out position to be released from the gripping member 100, then is received by the push-up plate 98, and then lowered until it is fit into the original position of the holder 58.

Afterwards, the holder 58 starts its intermittent rotation before it reaches the spot where a next chemical container 61 is taken out. And thereafter, the operations at the stages (2) to (7) are repeated for sequentially feeding the chemicals into the dissolving tank 101.

Thus, the automatic feed of chemicals is made possible. The operation of from the transport of chemicals containers 61 to the feed of the chemicals can be performed in a consecutive working mode, wherefrom an efficient feed operation for chemicals may result, and this also can easily cope with the situation which may use more dissolving tanks.

Weight Measurement to Introduction

Figure 31:
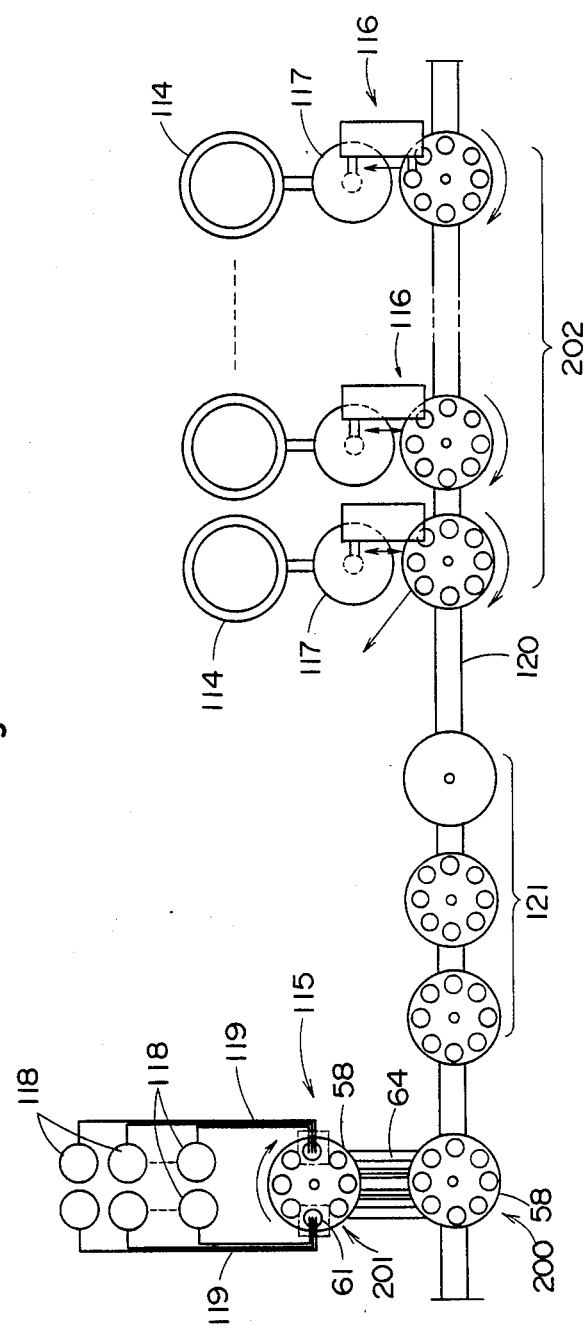
FIG. 31 is a view showing the transport passage from the weight measurement of chemicals to the introduction of same.

FIG. 31 is a chart exhibiting a course involving the stage of transporting chemicals from the weight measurement unit to the transport unit till the stage of introducing the chemicals into the dissolving tank 101 attached to the treatment tank 114, the weight measurement unit, transport unit and introduction unit used being shown in FIGS. 18–30.

At the weighing position 201 of the weighing unit 115, chemicals are put from various chemical storage tanks 118 into chemical containers 61 through inlet tubes 119 and weighed respectively, and then the holder 58 is slid on the rails 64 toward the position 200 where the holder is mounted and demounted. The holder 58, then, is transported along a transportation route 120, by means of the transport unit to the introduction unit 116. The introduction units 116 are provided on a plurality of treatment tanks 114 respectively, the chemical containers 61 are taken out of the holder 58 mounted on the determined introduction unit 116, so that the chemicals are put into the dissolving tank 117 attached to the treatment tank 114.

There is provided a stock space 121 having a stock rest for temporarily maintaining the holder 58 on the transportation route 120 between the position 200 of the weight measurement unit 115 and the position 202 of the introduction unit 116. The stock space 121 is used to keep filled chemical containers before feed and emptied containers after the feed for a period of time. The provision of such a stock space 121 may make flexible the relation between the preparation step for weight measurement and the treatment step for treating chemicals in each of the treatment tanks.

Figure 32:
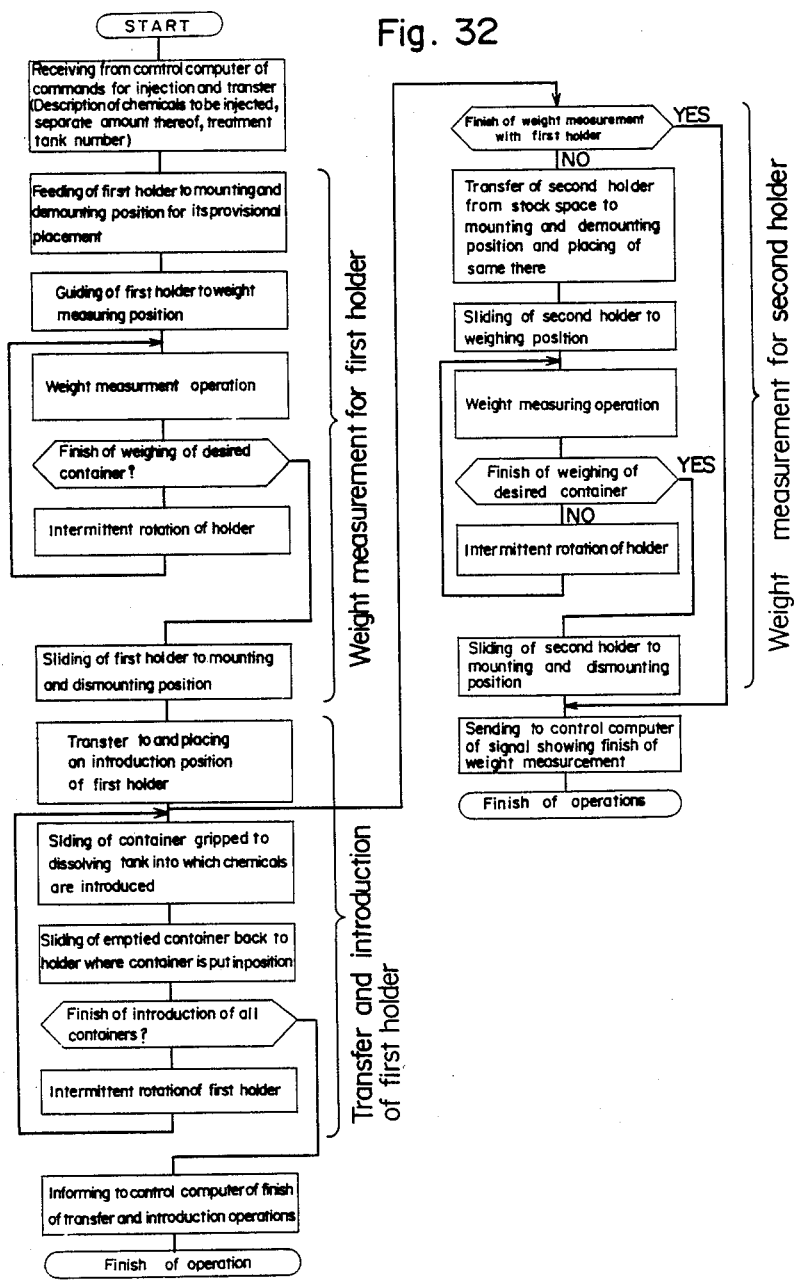
FIGS. 32 and 33 are flow charts showing the way of transportation as illustrated by FIG. 31.
Figure 33:
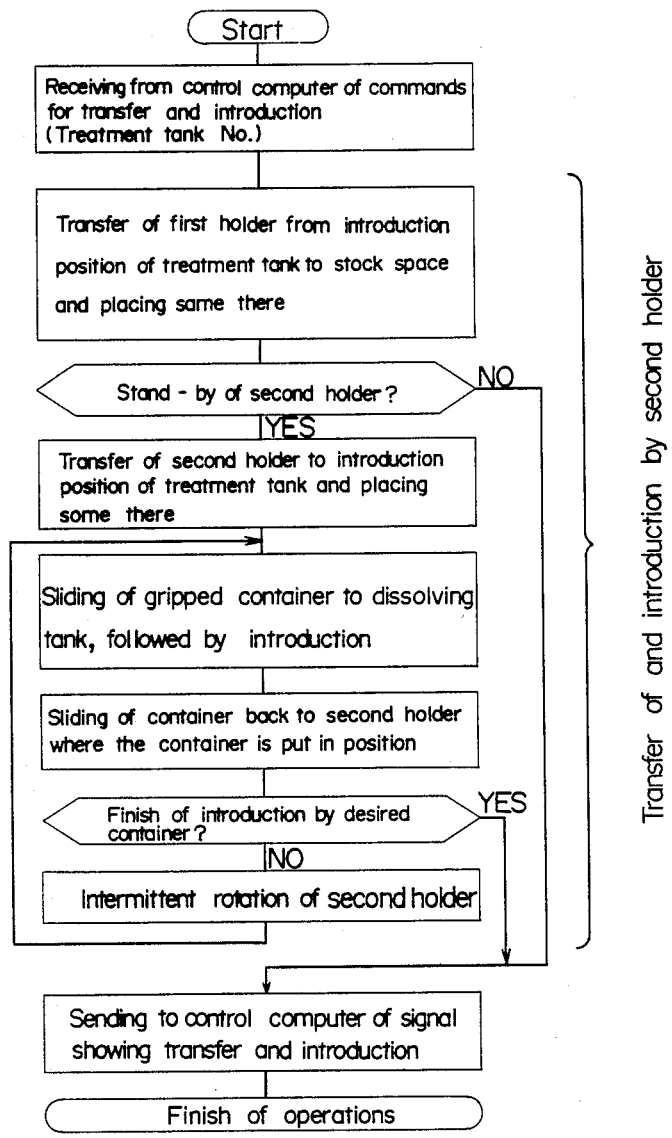

FIGS. 32 and 33 show operational procedures taken when the chemicals are introduced by the use of two holders 58 into a single treatment tank 114, wherein the operations of from the weight measurement by the two holders 58 to the introduction of chemicals can be smoothly and rapidly made by the temporary placement on the stock space 121 of the empty containers 61 after feed of chemicals. All these operations are achieved automatically under the command of the control computer.

The stock space 121 may be used to stand by a holder retaining filled containers instead of empty containers after the introduction.

Injection of Chemicals into Treatment Tank and Cleaning of Containers (I)

A chemical injection unit for injecting chemicals which have been introduced from the chemical containers 61 to the dissolving tank 110 into the treatment tank 114 and a cleaning unit for cleaning containers will be described with reference to FIG. 34.

The treatment tank 114 is connected to the dissolving tank 101 by an inlet pipe 139 and return pipe 122. The inlet pipe 139 has a pump 123 and an inlet valve 124 arranged in this order from the dissolving tank 101. The return pipe 122 is provided with a return valve 125.

The inspection pipe 139 is coupled to the return pipe 122 by a circulation pipe 126 branched from injection pipe 121 at the level of the pump 123 and injection valve 121 of the injection pipe 139. The circulation pipe 126 is provided with a circulation valve 127.

A first pipe 135 for cleaning of containers is branched to connect with the injection pipe 121 at the same position at which the circulation pipe 126 is placed, the first pipe 135 being coupled at its top end to a nozzle 128 for cleaning chemical containers. The first pipe 135 is provided with a first cleaning valve 129 and discharge valve 130. A second pipe 131 for cleaning of containers emerges downstream of the first cleaning valve 129 of the first pipe 135, and is provided with a second cleaning valve 132. Said nozzle 128 is positioned so that the top end of its injection opening may face the interior of chemical container 61 which is prepared to discharge the chemicals. As a result of it, a cleaning liquid jetted out of the nozzle 128 will be introduced into the dissolving tank 101.

Said dissolving tank 101 has a water supply pipe 133 mounted on the edge of an opening of the dissolving tank for injecting water into the inside of the dissolving tank 101.

Figure 34:
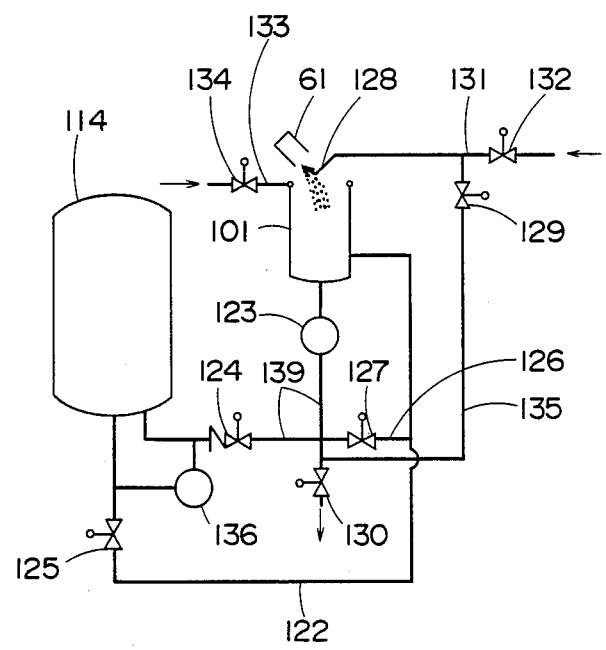
FIG. 34 is a view of a chemicals cleaning unit in accordance with the present invention.

Referring to FIG. 34, 136 is a circulation pump for circulating a treatment liquid injected into the treatment tank 114 and treating articles to be treated, such as textile goods stuffed in the treatment tank.

The opening and closing of said valves 124, 125, 127, 129, 130, 132, and 134, operation of pump 123, and introduction of chemicals are controlled by a control signal from the control computer respectively. The dissolving tank 101 has a level sensor (not shown) secured to the inside thereof for monitoring the level of a liquid contained in the dissolving tank, which level sensor is adapted to detect the liquid levels (high, middle, low), and them to transmit a level signal to the control computer, which will be operative in response to the received signal to put the respective valves, the pump 123 and the introduction of chemicals in motion.

Figure 35:
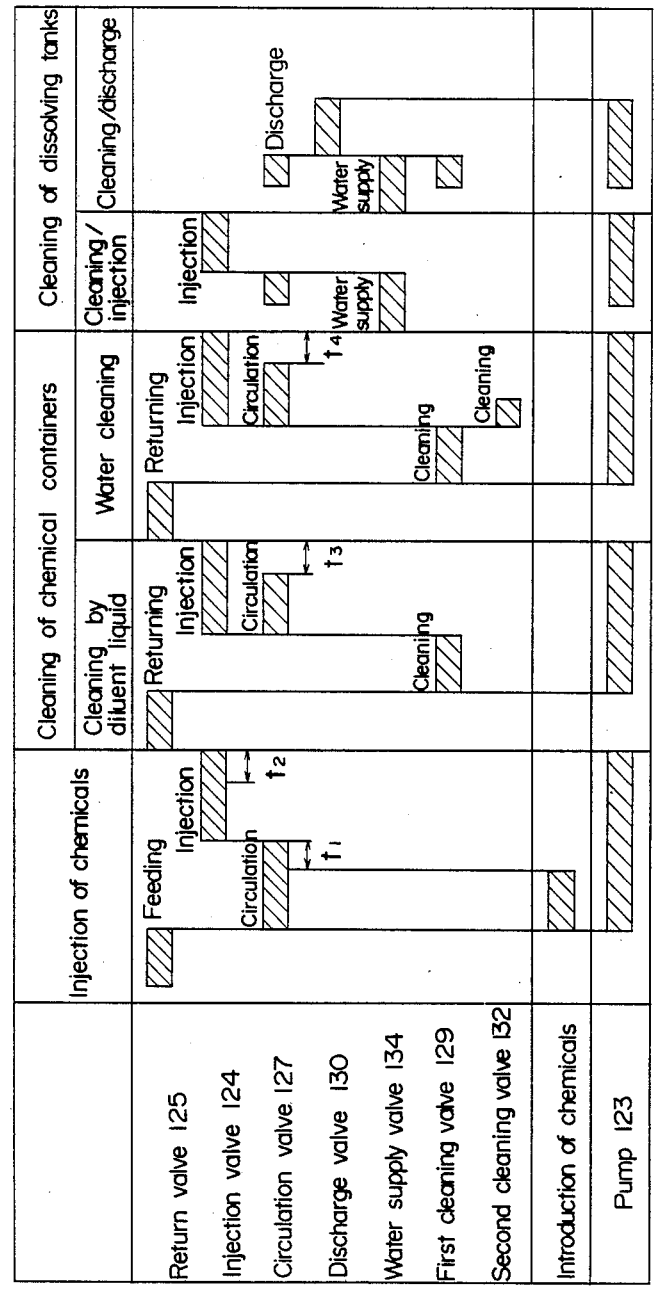
FIG. 35 is a time chart for the cleaning operation.

Next, the chemical injection and cleaning operations will be describes with reference to FIG. 35. The hatched portions in the drawing shows that the corresponding valves are opened, the chemicals are being introduced and the pump 123 is at work.

(a) Introduction of chemicals

Water at normal temperatures or heated to a raised temperature is supplied as a solvent medium to the treatment tank 114. Prior to the introduction of chemicals, the return valve 125 is opened to supply a determined amount of water from the treatment tank 114 to the dissolving tank 101. Upon introducing such a determined amount of water into the dissolving tank 101, which the level sensor detects, the return valve 125 is closed accordingly. Concurrently with the disclosure, the chemicals are introduced from the chemical container 61 into the dissolving tank, and the pump 123 is set in motion so as to open the circulation valve 127. Then, the injection valve 124 is kept closed. The chemicals and water are agitated into a uniform dissolution by circulating same through the circulating pipe 126.

After the introduction of chemicals, resultant solution is put in circulation for a certain period of time ($t_1$), and then the circulation valve 127 is closed while the injection valve 124 is opened, and the solution is injected into the treatment tank 114, wherein the solution is further mixed and diluted with water contained in the treatment tank 114. After the lever sensor senses the solution at a low level, the injection valve 124 remains open only for another period of time ($t_2$) until the introducing operation is finished with the consequential closure of the injection valve 124.

The introduction of chemicals may be achieved by inclining the container or opening a valve mounted on the bottom of the container instead of inverting the container.

(b) Cleaning of chemical containers

(b-1) cleaning with dilution

Upon finishing the introduction of chemicals into the treatment tank 114, the pump 123 is stopped, and the return valve 125 is opened so that the treated dilution inside the treatment tank 114 is partially returned to the dissolving tank 10. When the level sensor senses the arrival of the liquid in the dissolving tank 101 at a high (a middle) level, the return valve 125 is closed, and at the same time, the cleaning valve 129 is opened, causing the pump 123 to operate. Thus, the pump 123 is operative to apply a pressure to the treatment liquid which has just returned to the dissolving tank 101, and which will be ejected through the nozzle 128 to wash out chemical remnants deposited on the inside of the chemical container 61 which is in a inverse position, or in a position to introduce chemicals, and to introduce the washed chemicals into the dissolving tank 101. The duration for ejecting treatment liquid from the nozzle 128 may be determined on a case-by-case basis.

After cleaning the chemical containers 61, the first cleaning valve 129 is closed, and at the same time the injection valve 124 and the circulation valve 127 are opened; the treatment liquid in the dissolving tank 101 is moved around while agitated, cleaning the inner side of the circulation pipe until it is delivered to the treatment tank 114 in sequence, and at the time when the level of the liquid in the dissolving tank 101 is detected by the level sensor to be at a low position, only the circulation valve 127 is closed, and the injection valve 124 is kept opened for another period time ($t_3$) until the introducing operation is completed.

(b-2) Cleaning with water

Upon termination of the introducing operation, the return valve 125 is opened again, the dilutes liquid is returned from the treatment tank 114 to the dissolving tank 101, and then as in the described manner, with the first cleaning valve 129 opened, the treatment liquid is blown out of the nozzle 128 to wash down deposites liquid remaining inside the chemical container 61. After cleaning with the treatment liquid for a period of time, the first cleaning valve 129 is closed, while the second cleaning valve 132 is opened, and fresh water is passed through the pipe 131 to be blown out of the nozzle 128 for a short time for cleaning the interior of the chemical container 61. As for the amount of water to be ejected has been set the minimum value necessary for inhibiting dilution of the treatment liquid.

As soon as the second cleaning valve 132 is opened, the injection valve 124 and circulation valve 127 are opened, so that three different operations will be performed side by side with each other; the first one being to circulate and agitate the treatment liquid in the dissolving tank, the second one to clean the inside of the circulation pipe, and the third to inject chemicals into the treatment tank. And, then the detection by the level sensor of the liquid in the dissolving tank 101 being at a low level is followed by the corresponding closure of the circulation valve 127, and the injection valve 124 is kept opened for another period of time ($t_4$) until a full of the treatment liquid is injected into the treatment task 114, thereby to finish the cleaning of the chemical containers 61.

(c) Cleaning of dissolving tanks and circulation pipes (c-1) Washing with water of dissolving tank and circulation pipe and injection Upon finishing the cleaning of chemical containers 61, the pump 123 is stopped, and the water supply valve 134 is opened to supply fresh water to the dissolving tank 101. Then, after a while, the circulation valve 127 is opened, and the pump 123 is driven to move the water through the circulation pipe 126. Right after stopping of the water supply toward the dissolving tank 101, the circulation valve 127 is closed, and the injection valve 124 is opened to introduce a cleaning liquid into treatment tank 114, whereby the residual chemicals inside the dissolving tank 101 and circulation pipe 126 can be washed out.

(c-2) Washing with water of dissolving tank and circulation pipe and discharge

After finishing the injection into the treatment tank 114, the pump 123 is stopped again, and water is supplied to the dissolving tank 101. After some time, the circulation valve 127 and the first cleaning valve 129 are opened, and then the pump 123 is driven to flow water through the circulation pipe 126 and the first container cleaning pipe 135, which will result in washing the interiors of these pipes. Thereafter, the used water is discharged through the opened discharge valve 130 to the outside of the system.

In this way, the dissolving tank 101 and the circulation pipe 126 have been washed, and then the next introduction of chemicals will be prepared for further processing.

As is apparent from the above described, most of the residual chemicals deposited on the inner wall of the chemical containers 61 can be washed out of the containers 61 by treatment liquid ejected from the nozzle 128, thereafter to enter into the dissolving tank 101. Consequently, the used amount of water may be limited to a minimum in the operation of washing with fresh water to be effected at the final stage of cleaning chemical containers, thus resulting in a successful avoidance of diluting a treatment liquid to a degree of concentration higher than the determined and of eventual variation of concentration of the treatment liquid, both due to increase of the amount of a detergent caused by addition of fresh water.

Furthermore, it is possible to clean the inner sides of the dissolving tank 101 and circulation tank 126, and also to wash the treatment liquid remaining within the nozzle 128, whereby preparation for the next cycle may be simplified and increase of efficiency may be achieved.

Cleaning of Containers (II)

Figure 36:
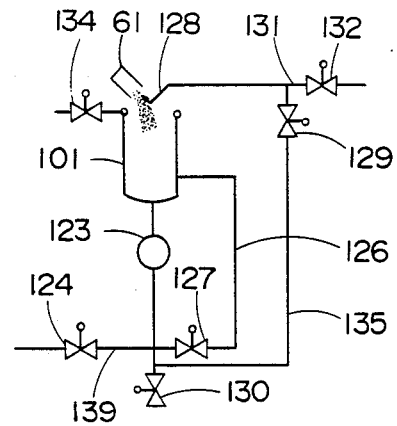
FIG. 36 is a view showing another chemicals cleaning unit.

As shown by FIG. 26, the cleaning apparatus for use in this cleaning of containers is essentially the same as the counterpart as shown in FIG. 24 except for the return pipe 122 omitted as well as the treatment tank 114 not shown in this case, the both members apparently being shown in FIG. 34. Therefore, the like components have the like symbols, and a detailed description thereof will be omitted. Now, the cleaning operation for chemical containers 61 will be described with reference to FIGS. 36 and 37.

Figure 37:
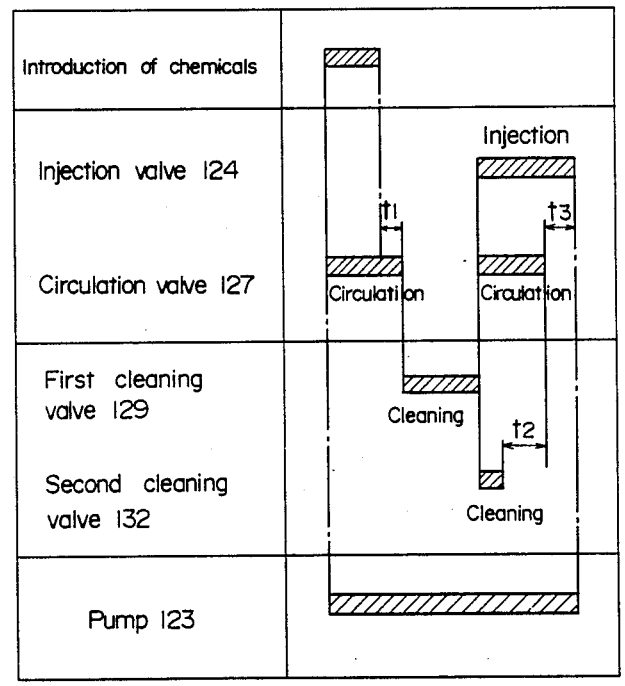
FIG. 37 is a time chart for the cleaning operation.
Figure 38:
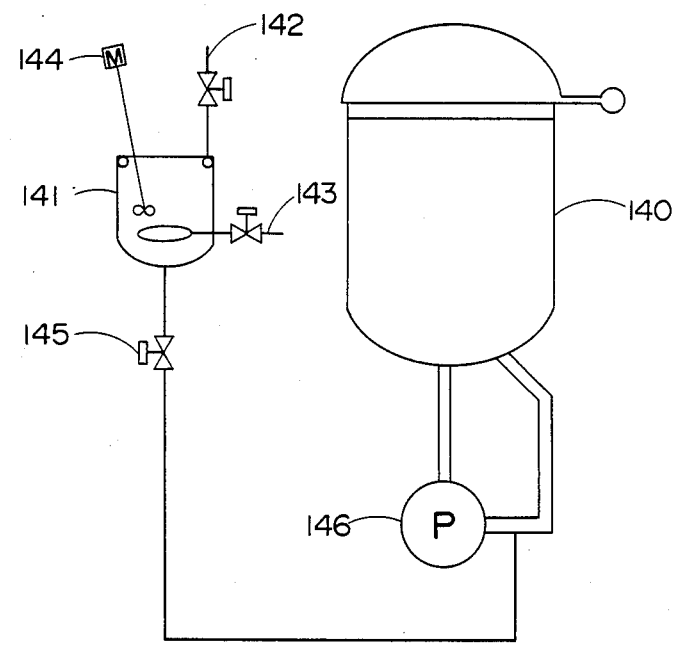
FIG. 38 is a view showing a way of the introduction of chemicals into a conventional dyeing machine.
Figure 39:
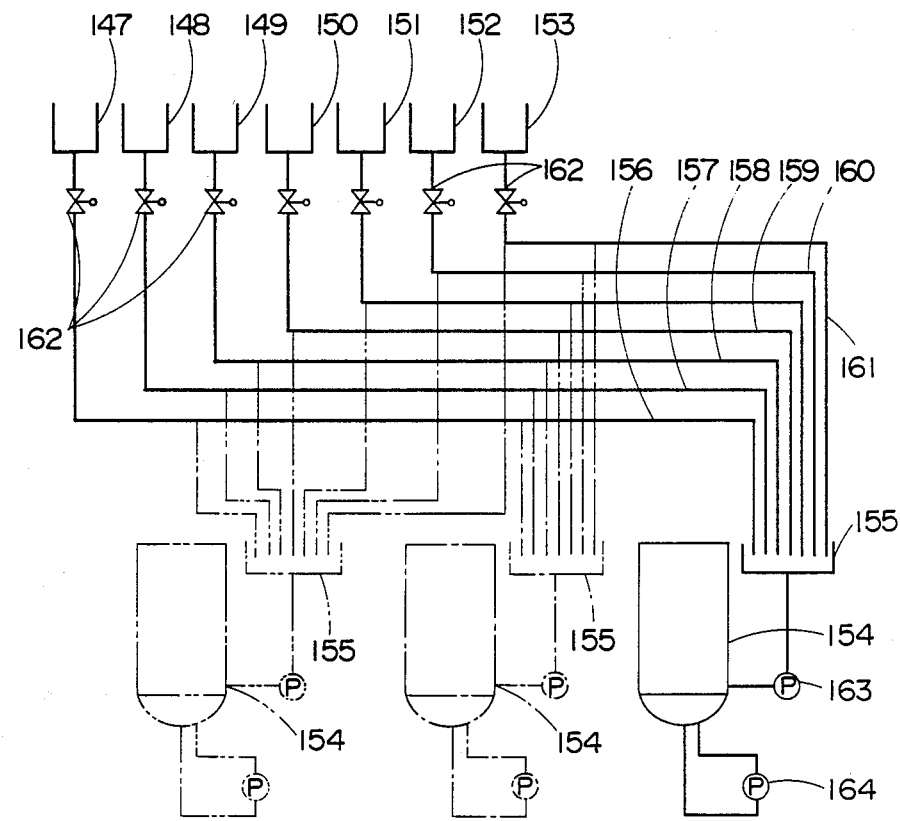
FIG. 39 is a view showing a conventional chemical supply system.

In FIG. 37, the hatched portions indicate that the corresponding valve is kept opened and the corresponding pump 123 is in an operative position.

(a) Introduction of chemicals and dissolution of same

The dissolving tank 101 contains a determined amount of water with the water valve 134 opened. Chemicals are introduced from the chemical container 61 into this dissolving tank 101. At the same time, the pump 123 is activated and the circulation valve 127 is opened. In this instance, the injection 124, and the first and second cleaning valves 129, 132 are kept opened. In this specific position, the chemicals are put into the dissolving tank 101, while the chemicals and water are passed through the circulation pipe 126 for agitation purpose, and even after finishing the introduction of chemicals, the circulative movement and the agitation are further continued for a given period of time ($t_1$) in order to dissolve the chemicals in the water to obtain liquid chemicals.

(b) Cleaning with liquid chemicals

The circulation valve 127 and the first cleaning valve 129 are opened at the same time, so that the liquid chemicals will be passed through the pipe 135 to jet out of the nozzle 128 for washing out the residual chemicals deposited on the inner wall of the chemical containers 61, and then the detergent is introduced into the dissolving tank 101.

(c) Washing with water and injection

After the cleaning operation has been carried out for some period of time, the first cleaning valve 129 is closed, and then the circulation valve 127 is opened so as to allow the liquid chemicals to move around, and said detergent is agitated in such a manner that it may be mixed with the liquid chemicals to a uniform degree, while the injection valve 124 is opened in order to start injection for the next procedure step. At the same time, the second cleaning valve 132 is opened, permitting a small amount of water to run through the pipe 131 to jet out of the nozzle 128 for the purpose of cleaning the inner wall of the chemical containers 61 as a final procedure before this detergent is put into the dissolving tank 101.

Even after the cleaning valve 132 has been closed, the circulation valve 127 is kept opened for a specified period of time ($t_2$) so that a uniform dissolution can take place, and even after the closing of the circulation valve 127, the injection valve 124 is kept opened for a time ($t_3$) until the completion of the injection process.

In FIG. 34, the opening and closing of the valves 124, 127, 129, 130, 132, 134 and the operating of the pump 123 as well as the operation of the chemical containers are controlled in response to a command signal from the computer.

This cleaning process for the containers also makes it possible to do with a minimum amount of water in its final washing stage, so as to avoid the inconveniences that the concentration of the liquid chemicals would become lower than required or variable otherwise. The use of a single nozzle 128 for cleaning with liquid chemicals and water makes it possible to simplify the structure of the system and to wash out the residual chemicals remaining within the nozzle 128.

What is claimed is:

1. A process for automatically weighing and introducing chemicals, comprising steps of injecting into chemical containers a necessary amount of desired chemicals chosen among plural kinds of chemicals such as dyestuffs or auxiliaries and weighing said chosen chemicals; transporting, in association with the operations of said injection and weight measurement, said chemical containers filled with said chemicals to a dissolving tank adjacent to a treatment tank; and introducing, in association with the transporting step, the chemicals from the chemical containers just arrived at said dissolving tank into the latter.

2. A process as defined in claim 1, wherein said injection step involves firstly injecting most of the chemicals at a large flow rate, and secondly injecting the rest of the chemicals at a small flow rate.

3. A process as defined in claim 1, wherein said weight measurement involves substeps of mounting a disk-shaped holder on a receiver located on the upper portion of a rotation means, the holder holding said chemical containers in a plurality of holes arranged circumferentially of the holder; rotating said holder on the receiver intermittently around a center shaft, removing at least one of the chemical containers engaged in said holes from said holder; injecting the chemicals into said removed chemical container and weighing the latter; and after the weighing operation, returning the chemical container to said corresponding hole, and wherein after the return of the chemical container, the substeps following said intermittent rotation are repeated so that the chemicals are put into the respective chemical containers held by said holder and then the holder is removed from the receiver of the rotation means together with the chemical containers.

4. A process as defined in claim 1, wherein said introduction step for introducing the chemicals from the chemical containers into the dissolving tank sequentially involves substeps of intermittently rotating around the center shaft of the disk-shaped holder holding the chemical containers in a plurality of holes arranged circumferentially of the holder to bring each of the chemical containers to a position where the chemical container is to be removed from the holder, lifting the chemical container just arrived at said position, transporting said lifted chemical container while gripped, toward said dissolving tank, and introducing the chemicals int the dissolving tank from said chemical container which has just arrived at the dissolving tank and which has been brought into an inverse or inclined position.

5. A process as defined in claim 1, wherein said introduction step involves a substep for cleaning the chemical containers, the substep consisting of a first dilution step for dissolving the chemicals with a solvent such as water in the dissolving tank adjacent to the treatment tank for obtainment of a dilute solution, the second dilution step for sending said dilute solution to the treatment tank to further dilute the solution with a solvent, a first cleaning step for returning said dilute solution to the dissolving tank and flowing the solution out of a nozzle to clean the interior of said chemical containers, a second cleaning step for cleaning the inside of said chemical container with a fresh solvent after the previous cleaning, and a final step for transporting to the treatment tank the detergent used in the first and second steps.

6. An apparatus for automatically weighing and introducing chemicals, comprising a means for injecting a determined amount of chemicals from plural kinds of tanks containing the chemicals such as dyestuffs or auxiliaries into chemical containers and weighing the latter; a transport means for transporting said chemical containers to the dissolving tank adjacent to the treatment tank; an introduction means for introducing the chemicals from the chemical containers just arrived at said dissolving tank into the latter; an injection control means for injecting desired chemicals by a necessary amount into said chemical container in response to a signal from said treatment tank issuing a command to introduce the chemicals; and a transport and introduction control means for actuating said transport means in response to a signal ordering the command to finish the injection of the chemicals into said chemical containers, to transport the latter to and introducing the chemicals into said dissolving tank.

7. An apparatus as defined in claim 6, wherein a pipe line for injecting chemicals from said chemical tanks into chemical containers has a first measuring valve for a large flow rate and a second measuring valve for a small flow rate connected in parallel with each other, and wherein the both valves are capable of being switched from one to another in response to a signal from said introduction control means.

8. An apparatus as defined in claim 6, wherein said means for injecting and weighing chemicals comprises a disk-shaped holder having a plurality of holes arranged circumferentially of the holder for holding chemical containers; a rotation means for detachably and horizontally maintaining said holder and intermittently rotating the holder around its center shaft; a lifting means for lifting the chemical containers fit in said holders from the holder; and a weighing means for measuring the weight of the chemicals to be injected into said chemical containers.

9. An apparatus as defined in claim 6, wherein said transport means for transporting the chemical containers comprises rails provided extending between the chemicals weighing and injecting means and the chemicals introducing means, a travelling means adapted to run along the rails, and a lifting means mounted on said travelling means said lifting means having a gripping member for detachably holding fast the holder carrying a plurality of the chemical containers.

10. An apparatus as defined in claim 6, wherein said introduction means comprises a disk-shaped holder holding chemical containers in its holes arranged circumferentially of the holder, an intermittent rotation means, in which said holder is removably engaged, adapted to rotate the holder intermittently around the center shaft of the holder, a take-out means for taking out the chemical containers from said holder at a specified position when the intermittent rotation means stops, a transport means having a grip means for gripping said lifted chemical containers and adapted to transport said chemical containers supported by said grip means just above the dissolving tank, and a rotation means for rotating the gripping member located above said dissolving tank to bring said chemical containers into an inverse or inclined position and then to introduce the chemicals into the dissolving tank.

11. An apparatus as defined in claim 6, wherein there is provided a stock space between said chemicals injecting and weighing means and said introduction means for storing the chemical containers.

12. An apparatus as defined in claim 6, wherein said introduction means includes a cleaning means for washing the inner side of said chemical containers with dilute solution obtained by dissolving the chemicals in a solvent such as water inside the dissolving tank.

13. An apparatus as defined in claim 12, wherein said cleaning means comprises an injection pipe disposed between said treatment and dissolving tanks and provided with a pump and an injection valve arranged in this order from the dissolving tank, a return pipe having a return valve and disposed separate from said injection pipe between said treatment and dissolving tanks, a circulation pipe having a circulation valve and branched from said injection pipe between said pump and injection valve to be connected to said return pipe, a chemical container cleaning nozzle having a nose facing the inside of said chemical container which is in a position to introduce chemicals, a first container cleaning pipe having a first cleaning valve and connected to said injection pipe between said pump and injection valve so as to deliver said treatment liquid to said nozzle, a second container cleaning pipe having a second cleaning valve and connected to the first container cleaning valve and connected to the first container cleaning pipe so as to supply a solvent to said nozzle, and a water supply pipe attached to said dissolving tank and provided with a water supply valve for cleaning said dissolving tank.

14. An apparatus as defined in claim 12, wherein cleaning means comprises a chemical container cleaning nozzle having a nose facing the inside of said chemical container which is in a position to introduce chemicals, an injection pipe disposed between said treatment and dissolving tanks and provided with a pump and an injection valve arranged in this order from the dissolving tank, a circulation pipe having a circulation valve and connected between said pump and injection valve with the injection pipe by one end thereof and with said dissolving tank by the other end, a first container cleaning pipe having a first cleaning valve and connected to said injection pipe between said pump and injection valve so as to deliver said treatment liquid to said nozzle, and a second container cleaning pipe having a second cleaning valve and connected to the first container cleaning pipe so as to supply a solvent to said nozzle.

* * * * *